United States Patent [19]

Vicik

[11] Patent Number: 5,549,943
[45] Date of Patent: Aug. 27, 1996

[54] HEAT SHRINKABLE NYLON FOOD CASING WITH A POLYOLEFIN CORE LAYER

[75] Inventor: Stephen J. Vicik, Darien, Ill.

[73] Assignee: Viskase Corporation, Chicago, Ill.

[21] Appl. No.: 948,552

[22] Filed: Sep. 23, 1992

[51] Int. Cl.$^6$ .............................. F16L 11/00; B65D 81/34
[52] U.S. Cl. .................. 428/34.8; 428/475.8; 428/476.3; 428/476.1; 138/118.1; 264/562; 264/563; 264/514; 264/209.6; 206/802; 426/105; 426/278; 426/127; 426/138; 452/21; 452/30
[58] Field of Search ................................. 428/34.8, 475.8, 428/476.1, 476.3; 138/118.1; 264/562, 563, 514, 209.6; 206/802; 426/105, 278, 129, 138; 452/21, 30

[56] References Cited

U.S. PATENT DOCUMENTS

| | | | |
|---|---|---|---|
| Re. 29,340 | 8/1977 | Matsunami et al. | 428/216 |
| 3,022,543 | 2/1962 | Baird, Jr. et al. | 18/57 |
| 3,076,232 | 2/1963 | Dengler | 18/48 |
| 3,278,663 | 10/1966 | Graham | 264/95 |
| 3,337,665 | 8/1967 | Underwood et al. | 264/95 |
| 3,456,044 | 7/1969 | Pahlke | 264/25 |
| 3,555,604 | 1/1971 | Pahlke | 18/14 |
| 3,697,368 | 10/1972 | Bhuta et al. | 161/227 |
| 3,804,574 | 4/1974 | Gatto | 425/388 |
| 3,955,040 | 5/1976 | Schirmer | 428/474 |
| 4,087,587 | 5/1978 | Shida et al. | 428/500 |
| 4,093,794 | 6/1978 | Chippaux | 526/344 |
| 4,230,830 | 10/1980 | Tanny et al. | 525/222 |
| 4,243,074 | 1/1981 | Strutzel et al. | 138/118.1 |
| 4,303,711 | 12/1981 | Erk et al. | 428/36 |

(List continued on next page.)

FOREIGN PATENT DOCUMENTS

| | | | |
|---|---|---|---|
| 2043187 | 11/1991 | Canada . | |
| 0183512 | 6/1986 | European Pat. Off. | B32B 27/08 |
| 0264269 | 4/1988 | European Pat. Off. | C08H 5/43 |
| 0318964 | 6/1989 | European Pat. Off. | B65D 65/40 |
| 374783 | 6/1990 | European Pat. Off. . | |
| 450435 | 10/1991 | European Pat. Off. . | |
| 465931 | 1/1992 | European Pat. Off. . | |
| 0467039 | 1/1992 | European Pat. Off. | B32B 27/34 |
| 530538 | 3/1993 | European Pat. Off. . | |
| 530549 | 3/1993 | European Pat. Off. . | |
| 530539 | 3/1993 | European Pat. Off. . | |
| 2926439 | 1/1980 | Germany | B65D 31/02 |
| 3212343 | 10/1983 | Germany | B65D 37/00 |
| 3212344 | 10/1983 | Germany | B65D 37/00 |
| 3227945 | 2/1984 | Germany | B65D 37/00 |
| 39035 | 7/1979 | Japan | B32B 27/34 |
| 58-089361 | 5/1983 | Japan | B32B 27/32 |
| 61-104847 | 5/1986 | Japan | B32B 27/34 |
| 43626 | 5/1989 | Japan | B32B 27/34 |
| 1/242245 | 9/1989 | Japan | B32B 27/28 |
| 2040223 | 8/1980 | United Kingdom | B32B 7/10 |

OTHER PUBLICATIONS

*Modern Plastics Encyclopedia*, 88, vol. 64, No. 10A, pp. 34–37, 554 and 555 (McGraw–Hill, Inc., 1987).

Nucrel® 1202HC High Performance Adhesive and Sealant Resins Product Information For Blown and Cast Film, 4 page brochure (H–23752) dated Dec. 1989 (DuPont Company, Wilmington Delaware).

Montor Performance Plastics Montor Nylon for Film Application, 8 page brochure having a print date of Jun. '91 (Montor Performance Plastics Company, Auburn Hills, Michigan).

Molding and Extrusion Materials Ethylene–Vinyl Acetate Copolymer DQDA–6833 Natural 7, 4 page brochure dated 1990 (Union Carbide Chemicals & Plastics Technology Corporation, Danbury, Connecticut).

Plexar® 169, 2 page brochure having a publication date at least as early as 1992 (Quantum Chemical Corporation, Cincinnati, Ohio).

*Primary Examiner*—Charles Nold
*Attorney, Agent, or Firm*—Cedric M. Richeson

[57] ABSTRACT

Tubular, biaxially stretched, heat shrinkable multilayer film food casings comprising inner and outer polyamide layers on either side of a core layer predominantly of one or more polyolefins such as VLDPE or EVA and a coextrusion process for making the film.

36 Claims, 2 Drawing Sheets

U.S. PATENT DOCUMENTS

| | | | |
|---|---|---|---|
| 4,322,480 | 3/1982 | Tuller et al. | 428/476.1 |
| 4,394,485 | 7/1983 | Adur | 525/74 |
| 4,401,256 | 8/1983 | Krieg | 229/53 |
| 4,411,919 | 10/1983 | Thompson | 426/412 |
| 4,420,516 | 12/1983 | Ermert et al. | 428/35 |
| 4,486,507 | 12/1984 | Schumacher | 428/476.1 |
| 4,560,520 | 12/1985 | Erk et al. | 264/22 |
| 4,590,106 | 5/1986 | Hsu et al. | 428/35 |
| 4,601,929 | 7/1986 | Erk et al. | 428/36 |
| 4,606,922 | 8/1986 | Schirmer | 426/412 |
| 4,640,852 | 2/1987 | Ossian | 428/35 |
| 4,659,599 | 4/1987 | Strutzel | 428/36 |
| 4,717,618 | 1/1988 | Tse et al. | 428/213 |
| 4,729,410 | 3/1988 | Inagaki | 138/118.1 |
| 4,760,116 | 7/1988 | Roberts | 525/221 |
| 4,769,421 | 9/1988 | Hwo | 525/240 |
| 4,797,235 | 1/1989 | Garland et al. | 264/22 |
| 4,818,592 | 4/1989 | Ossian | 428/216 |
| 4,855,183 | 8/1989 | Oberle | 428/345 |
| 4,882,894 | 11/1989 | Havens et al. | 53/461 |
| 4,886,634 | 12/1989 | Strutzel et al. | 264/560 |
| 4,888,223 | 12/1989 | Sugimoto et al. | 428/34.9 |
| 4,892,765 | 1/1990 | Hisazumi et al. | 428/34.8 |
| 4,897,295 | 1/1990 | Erk et al. | 428/34.8 |
| 4,908,272 | 3/1990 | Harada et al. | 428/412 |
| 4,911,963 | 3/1990 | Lustig et al. | 428/36.91 |
| 4,944,970 | 7/1990 | Stenger et al. | 428/34.8 |
| 4,963,426 | 10/1990 | Nishimoto et al. | 428/213 |
| 5,025,922 | 6/1991 | Havens et al. | 206/328 |
| 5,053,259 | 10/1991 | Vicik | 428/36.91 |
| 5,055,355 | 10/1991 | Deantonis et al. | 428/476.3 |
| 5,069,955 | 12/1991 | Tse et al. | 428/213 |
| 5,077,109 | 12/1991 | Lustig et al. | 428/36.91 |
| 5,094,799 | 3/1992 | Takashige et al. | 264/514 |
| 5,185,189 | 2/1993 | Stenger et al. | 428/34.8 |

HEAT SHRINKABLE NYLON FOOD CASING WITH A POLYOLEFIN CORE LAYER

BACKGROUND OF THE INVENTION

The present invention relates to oriented nylon casings, particularly food casings suitable for making sausage.

Tubular films are used as sausage casings for processing and packaging cooked sausages including water cooked or steam cooked sausages such as liver sausage and fleischwurst or cheese sausage (cheese packed in the shape of a sausage).

It is generally known that selection of films for packaging food products such as meat and cheese sausages includes consideration of one or more criteria such as cost, abrasion resistance, wrinkle resistance, meat adhesion, dimensional uniformity and stability, stiffness, strength, printability, durability, oxygen and water barrier properties, stretchability, machinability, optical properties such as haze, gloss and freedom from streaks and gels, and safety for contact with food.

In general, commercial sausage making operations for making water cooked or steam cooked sausages require casings made from materials able to perform well in the following typical process steps:

1. Stuffing with meat emulsion to a uniform diameter;
2. Clipping or otherwise sealing the casing about its circumference to form discrete logs;
3. Cooking the encased sausage to temperatures of at least 65°–100° C.;
4. Chilling the cooked encased sausages e.g. to temperatures as low as 4° C. or less;
5. Optionally cutting the logs into discrete lengths or slices; and
6. Repackaging cut logs or slices e.g. by vacuum packaging.

Various monolayer and multilayer casings have been proposed and used commercially to make water cooked or steamed cooked sausages such as fleischwurst and liver sausage. These sausages are typically made in casings having moisture barrier properties to prevent loss of water during and after cooking. The palatability of these sausages may be altered by changes in their moisture content. Excess water absorption may dilute the flavor and texture of the sausage, while loss of moisture may dry out the sausage and adversely affect both the texture and flavor. Also, sausages are traditionally sold by weight and any loss of moisture results in a loss of weight and may reduce profit to the seller.

Desirably, casings for these types of sausages will also have low oxygen permeability to avoid discoloration, adverse flavor changes and oxidation of the sausage during storage. Liver sausage in particular is easily susceptible to defects when contacted with excessive oxygen and discoloration causing an unappetizing appearance may be a particularly acute problem for this product.

Furthermore, it is highly desirable to produce an encased cooked sausage which exhibits a tight fitting casing having few or no wrinkles even after prolonged storage. There should be a minimum of spaces or pockets between the sausage mass and the inside of the casing since such spaces or pockets promote separation and collection of fats, liquid and gelatinous materials in such spaces which leads to a non-uniform sausage appearance which is unappetizing and undesirable to consumers.

Cellulose casings of e.g. fiber reinforced regenerated cellulose coated with moisture barrier coatings such as a polyvinylidene chloride copolymer (PVDC) e.g. saran, have been commercialized as have monolayer casings made of polyvinylidene chloride copolymers such as saran. These casings have excellent oxygen and moisture barrier properties.

Also, commercially available coated cellulosic casings have excellent dimensional uniformity and stability, but disadvantageously are expensive to produce compared to plastic casings. Also, use of polyvinylidene chloride copolymers such as saran has raised environmental concerns due to the difficulties of recycling chlorinated polymers and possible release of chlorinated by-products during incineration. Furthermore, the dimensional stability and uniformity of saran monolayer casings are generally inferior to the cellulosic casings, and saran monolayer casings after cooking and chilling tend to relax causing a wrinkled appearance.

Plastic casings are typically made by either blown film or oriented film processes. Biaxially stretched sausage casings of polyethylene terephthalate (PETP) have been made and are known in the art as well as biaxially stretched casings of polyvinylidene chloride copolymers (PVDC). These casings reportedly have much improved tensile strength and increased dimensional stability during stuffing compared to unstretched plastic sausage casings made from blown film. However, these stretched casings result in wrinkle-free sausages only if the encased sausages are subjected, after cooking and cooling, to an additional heat treatment which is known in the art as "after-shrinking". "After-shrinking" means that the cooked and cooled sausage (approximately 4° C.) is heated to at least about 80° C. or higher for a few seconds in a hot water bath or by hot air treatment. During this heat treatment, the casing shrinks and lies more closely and wrinkle-free against the encased sausage meat, the volume of which had been previously reduced by cooling. This additional after-shrinking step is not required in the manufacturing process for boiling and scalding sausages using cellulosic casings. Consequently, this subsequent processing step, which requires additional equipment, energy, time and money is undesirable. In addition to wrinkle-formation, biaxially stretched sausage casings of PETP and PVDC also reportedly show undesirable deposits of fat, liquid or gelatinous material which collects in pockets or spaces between the sausage material and the sausage casing thereby producing an undesirable appearance to the consumer.

To ameliorate the aforementioned problems and costs associated with coated cellulosic casings and PVDC-type casings, several polyamide casings have been introduced into the market. Both monolayer and multilayer polyamide casings have been commercialized and both non-shrinkable and shrinkable casings have been utilized made by blown film and oriented film processes.

As discussed in U.S. Pat. No. 4,303,711 "single-layer, unstretched plastic casings consisting of higher homopolyamides (polyamide 11 and polyamide 12)" are known as well as plastic casings consisting of such polyamides coextruded in two layers with polyamide 6 as the outer layer. These polyamide casings may be easily made by the blown film technique, but typically suffer from a lack of dimensional stability and uniformity, being deformed upon stuffing so that production of stuffed sausages to a uniform diameter is difficult. The '711 patent further indicates that these unstretched films suffer from an undesirably wrinkled appearance after cooking and chilling.

As noted above, to overcome the defects or inadequate performance of seamless thermoplastic casings produced by blown film technology, plastic casings have been produced utilizing stretch orientation.

Also, various attempts have been made at making stretch oriented polyamide casings. Uniaxially stretched casings which are only stretched in the longitudinal (machine) direction reportedly have the same disadvantages as unstretched casings regarding insufficient dimensional stability, nonuniformity of diameter and excessive wrinkling.

Erk et al. U.S. Pat. No. 4,560,520 discloses forming multiaxially stretched, monolayer, polyamide, tubular films e.g. of nylon 6 or nylon 66 which have elastic properties and which are said to be used for packaging table sausages and boiled sausages. The disclosed films are "fixed thermally" and shrunk after stretching e.g. by subjecting the tube to controlled shrinkage of at least 15% and at most 40% at temperatures above 90° C. and also subjecting the film to infrared irradiation. This is to produce a nylon casing which does not have shrinkage at temperatures under 90° C. This pre-shrunk casing is used for stuffing with meat emulsion and relies upon its elastic properties to provide wrinkle resistance.

The above '520 patent refers to the wrinkle problem associated with use of thermoplastic casings and states that:

"nearly all of the thermoplastic materials used as sausage casings have the disadvantage that once the sausage has been boiled and subsequently cooled they do not fit round the sausage material closely, in the manner of a natural casing, but appear to be more or less wrinkled. The customer equates such wrinkled appearance with old goods that are no longer fresh, and this is an obstacle to sale. For this reason up to now such sausage casings of thermoplastic materials have only been used by sausage makers for second-rate goods".

This patent goes on to refer to a "shrinkable multiaxially stretched thermally fixed sausage casing of polyamide" which remains close fitting but suffers from insufficient resistance to tearing. The assignee of this patent, Naturin-Werk Becker & Company has commercialized several monolayer nylon casings under the trademarks Optan, Betan and Tripan.

Nylon monolayer casings whether made by the blown film process or the stretch oriented film process are disadvantageously sensitive to moisture. As noted above it is desirable for casings used to package fleischwurst and liver sausage type products to have low permeability to steam or water. Also, moisture is known to adversely affect the oxygen barrier properties of many nylons causing an undesirable increase in oxygen transmission rates when wet. In view of these disadvantages, attempts have been made to utilize blends of nylon with other materials to enhance properties such as gas and water vapor impermeability. For example, U.S. Pat. No. 4,303,711 discloses a plastic casing made from a mixture of polyamide and ionomer. Also, the company Hoechst AG has commercialized what are believed to be monolayer casings containing blends of polyamide and polyester.

Furthermore, attempts have been made to use nylon in biaxially stretched multilayer casing to overcome these disadvantages. For example, U.S. Pat. No. 4,888,223 discloses 2 to 5 layer heat shrinkable tubular structures all having polyamide in either the outer layer or core layer and having a polyolefin inner layer that is corona treated for meat adhesion.

Also, U.S. Pat. No. 4,855,183 discloses a multilayer tubular shrink film having a polyamide inner layer which is irradiated to promote meat adhesion and which has additional polyolefinic layers which may comprise materials such as EVA, EMA, EEA, LLDPE, VLDPE, LDPE, HDPE or MDPE.

Disadvantageously, the above '223 and '183 patents disclose structures that require a corona treatment or irradiation step to enhance meat adhesion thereby requiring additional equipment, processing time and/or cost.

Without admitting that it is prior art, it is noted that European Patent Document No. 467,039 discloses a multilayer casing which may consist of a three layer coextruded and biaxially oriented tube which, if desired, may be "thermofixated". A structure having inner and outer polyamide layers separated by a middle layer of polyolefin which blended with or coated with an adhesion imparting component is disclosed for use as a sausage casing with low permeability to steam and oxygen. The middle layer is preferably a polyolefin blended with an adhesion imparting component in a portion which in general is 5–50 weight percent based on the polymer blend present in the middle layer. The polyolefin is stated to be usually a homopolymer of ethylene or propylene or a copolymer of linear alpha-olefins having 2 to 8 carbon atoms or a blend thereof. $C_2/C_3$ and $C_3/C_4$ copolymers are said to be useful as well as $C_2/C_3/C_4$ terpolymers or a blend of a $C_3/C_4$ copolymer with $C_2/C_3/C_4$ terpolymer. The two examples disclosed both specify HDPE. According to this document the portion of the adhesion imparting component is preferably 10 to 35% by weight but "should be kept as low as possible". This adhesion component is viewed as being required to prevent layer separation during cooking in hot water. Useful adhesion imparting agents are disclosed as including polyolefin resin modified with functional groups such as vinyl acetate, acrylic acid and methacrylic acid as well as their esters and salts and furthermore ethylenically unsaturated carboxylic anhydride groups. These casings are oriented by biaxial stretching. To improve dimensional stability after stretching, the casing is annealed to produce a material having a shrinkage of less than 20%, in particular less than 15% in both vertical and horizontal directions at temperatures of up to 90° C.

The above mentioned EP Document No. 467,039 discloses preparation of its casing by reference to EP 305 874 (which corresponds to U.S. Pat. No. 4,886,634), which discloses a rather complicated apparatus employing e.g. a vacuum tank and probe pipe with a sealing element. Also, blending polyester with the polyamide is suggested to facilitate biaxial stretching.

Disadvantageously, orientation of seamless tubes of nylon by biaxial stretching is difficult. Extrusion and orientation of multilayer tubes, especially coextruded tubes, containing mixed layers of polyamides and other materials having different melting points, melt viscosities, and a different affinity for water can be very difficult. For example, Hisazumi et al. U.S. Pat. No. 4,892,765 notes that although it is desirable to extrude films for packaging hams and sausages in tubular form, it is difficult to make a stretched tubular polyamide film of uniform thickness. This patent also notes that layer adhesion becomes weak when multilayer, polyamide films are stretched. Hisazumi et al. disclose production of a heat shrinkable multilayer film having a core layer of a polyvinylidene chloride copolymer attached to opposing polyamide layers (e.g. of nylon 6/66 copolymer) by opposing adhesive layers. This film is made using an orientation process which utilizes water to soften and plasticize the nylon to a degree sufficient to allow or facilitate orientation. In order to condition nylon with water prior to orientation the primary extruded tube is exteriorly and interiorly treated with water. In forming multilayer films having a nylon interior layer such conditioning of the interior layer is difficult particularly where relatively small diameters of primary tubing is used (e.g. less than 1.9 inches (4.8 cm)). Introduction of water to the inside of the tube may generally be accomplished either through the die, by perforating the casing and introducing a trapped slug of water or through permeation across the casing wall from the outside of the tube. Disadvantageously, introduction of water through the die is difficult because temperatures of the die and the extruding polymer melt are generally above the boiling point of water causing vaporization. Also, introducing a slug of water through a perforation in the tube wall creates waste in the area of perforation and makes that portion of the primary tube difficult if not impossible to stretch orient. Also, small diameter casing may only hold a small volume of water which is quickly absorbed thereby necessitating addition of further slugs which disrupt and slow operations in addition to creating additional waste. Also, multilayer films containing a moisture barrier layer or having a polyamide blended with a moisture barrier resin made it difficult if not impossible to condition by moisture permeation across the moisture barrier. Generally, attempts at biaxially stretching nylon multilayer casing have utilized polyamide as the outer layer of the tube. The orientation processes employed for nylon multilayer casing have tended to involve complicated apparatus and processing such as that found in U.S. Pat. No. 4,886,634.

Also, coextrusion of polyvinylidene chloride copolymers (PVDC) with polyamides or polyolefins is difficult because polyvinylidene chloride copolymers are very termperature and shear sensitive during extrusion. These copolymers are extrudable only over a narrow temperature range without causing degradation of the polymer in the extruder or die. Thermal degradation of polyvinylidene chloride copolymers form particles or gels of degraded material which may exit the die and cause imperfections in the film. Even at optimum extrusion temperatures, a certain amount of degraded PVDC material will form in the extruder and die, necessitating periodic cleaning and removal from service of the equipment. Polyamides require much higher temperatures for extrusion generally about 200° C. or higher. At these higher extruder and die temperatures coextrusion of polyamide with PVDC is difficult and degradation of the PVDC may be expected even if the PVDC layer is insulated from polyamide layers by intermediate layers. Resulting imperfections in the film may detrimentally affect the appearance, strength and barrier properties of the film and/or ease of orientation or biaxial stretching.

In summary, although several of the aforementioned plastic casing products have gained varying degrees of commercial acceptance in different market segments, their advantage compared to the traditional cellulosic casing has been chiefly one of cost with the problems of dimensional stability, uniformity of diameter, and wrinkling being persistent concerns.

Prior art fiber reinforced cellulose casings coated with moisture barrier coatings perform well in processing water/steam cooked sausages such as fleischwurst and liver sausage. However, the high cost of manufacture of such casings has led casing manufacturers to search for less expensive alternatives. Thermoplastic films of various compositions have been suggested and some have found varying degrees of success in various segments of the market. Thermoplastic sheet film has been made into a tube by seaming, but this is a difficult process which produces a casing having a seamed area which may undesirably differ in appearance and performance relative to an unseamed casing.

Seamless tubular thermoplastic casings have been made which overcome the objections to seamed casings. Various materials have been employed, but materials containing chlorinated polymers have been objected to for environmental reasons among others. Seamless polyamide casings have been made of blown film, however these casings tend to have poor performance with respect to wrinkling, uniformity of diameter, and dimensional stability. Seamless biaxially oriented multilayer films have also been made, however, such films have been difficult to produce requiring special blend formulations and structures or complicated equipment and procedures.

Therefore, it is an object of the present invention to provide a multilayer, biaxially stretched, heat shrinkable, thermoplastic film useful as a casing for making sausages such as fleischwurst or liver sausage which includes among its desirable properties one or more, preferably a combination, of the following:

a) sufficient flexibility and softness to facilitate shirring and subsequent stuffed log formation by gathering of the casing and clipping to form the sausage ends;

b) resistance to permanent deformation during stuffing, cooking and chilling, and maintenance of a symmetrical cylindrical shape with a minimum of curvature or bulging;

c) an ability to adhere to the meat during expansion and contraction of the sausage during cooking and chilling;

d) resistance to bursting or tearing during stuffing, during cooking at elevated temperatures, and during subsequent handling;

e) resistance to wrinkling during processing and handling;

f) little or no moisture loss during cooking and storage i.e., high cooking yield;

g) resistance to passage of oxygen in order to prevent spoilage; and h) an ability to be cut or sliced easily without edge curling or splitting.

It is a further object of the present invention to provide a tubular film having a unique combination of shrink, mechanical strength and barrier properties suitable for use as a sausage casing.

It is a further object of the present invention to provide a polyamide sausage casing having a polyamide inner layer which adheres to meat without requiring addition of starch based additives or treatment with electron beam irradiation or corona discharge.

It is a further object of the present invention to provide a multilayer oriented structure having sufficient shrinkage values and shrink force values to provide good conformation of the casing to the filling after cooking, chilling and storage.

It is a further object of the present invention to provide an improved biaxially stretched, heat shrinkable polyamide containing multilayer casing.

It is a further object of the invention to provide a casing having the above properties at a minimum of cost.

A further object of the invention is to provide a process of manufacture which is as simple and inexpensive as possible consistent with production of a film casing having the desired performance characteristics.

SUMMARY OF THE INVENTION

The foregoing objectives may be provided according to the present invention, in a novel tubular, biaxially stretched, heat shrinkable, multilayer film, food casing. This newly disclosed film has an inner layer comprising a polyamide; an outer layer comprising a polyamide; and a core layer comprising at least 60% by weight of one or more polyolefins such as low density polyethylene (LDPE), high density polyethylene (HDPE), linear low density polyethylene (LLDPE), very low density polyethylene (VLDPE), polypropylene, copolymers of ethylene with at least one $C_3$–$C_{10}$ α-olefin, and ethylene polymers having at least one functional moiety selected from the group of esters, anhydrides, and carboxylic acids including copolymers of ethylene with a vinyl ester, copolymers of ethylene with an alkyl acrylate, and blends of such polyolefins. In the inventive film, the core layer is disposed between the inner layer and the outer layer, and the multilayer film has a shrinkage value of at least 10% (preferably at least 15–20%) in at least one direction at 90° C. (preferably in both the longitudinal and transverse directions). These inventive films are surprisingly easy to process and orient and have excellent optical properties. They are capable of being shirred and used as sausage casings with fewer wrinkles than many commercialized prior art nylon casings. They do not require "after shrinking", the layers adhere well to one another without delamination and have excellent dimensional stability, uniformity of diameter and appearance.

Surprisingly, the present invention provides a relatively simple process and multilayer film which achieves a high degree of performance in providing a dimensionally stable film of uniform diameter which is suitable for shirring, stuffing, cooking and general manufacture of sausages such as fleischwurst and liver sausage having an excellent cooking yield, and a tight wrinkle-free appearance without requiring an after shrinking step.

Beneficially in one embodiment of the invention, the casing may be made by a continuous process in which a seamless tube is coextruded through an annular die, cooled below the melting points of each layer with water, biaxially stretch oriented, and annealed at an elevated temperature to dimensionally stabilize the seamless tubular film. Advantageously, the melt plastified coextruded thermoplastic tube will have an exterior surface and interior surface and comprise inner and outer polyamide layers, preferably nylon 6/66 copolymers with a core layer between of at least one polyolefin such as VLDPE blended with at least one copolymer of ethylene with between 3 to 14 weight percent of an ester, a carboxylic acid or an anhydride. Biaxial stretching may be facilitated by causing the outer polyamide layer to absorb water after extrusion and cooling, and prior to stretch orienting at an elevated temperature. Orientation may be accomplished by transferring a cooled extruded multilayer tube to an orientation zone where it is reheated to a temperature below the melting point of each layer followed by cooling while a fluid mass such as air is admitted to the interior of the tube as the tube passes between first and second means for blocking fluid flow along the interior of the tube. This causes the tube to stretch circumferentially about the entrapped fluid mass while at a temperature above the glass transition temperature and below the melting point of the predominant polymer of each layer. Simultaneous with this circumferential stretching, the tube is stretched in a direction perpendicular thereto to produce a biaxially stretched and oriented tubular film.

DETAILED DESCRIPTION OF THE INVENTION

Figure 1:
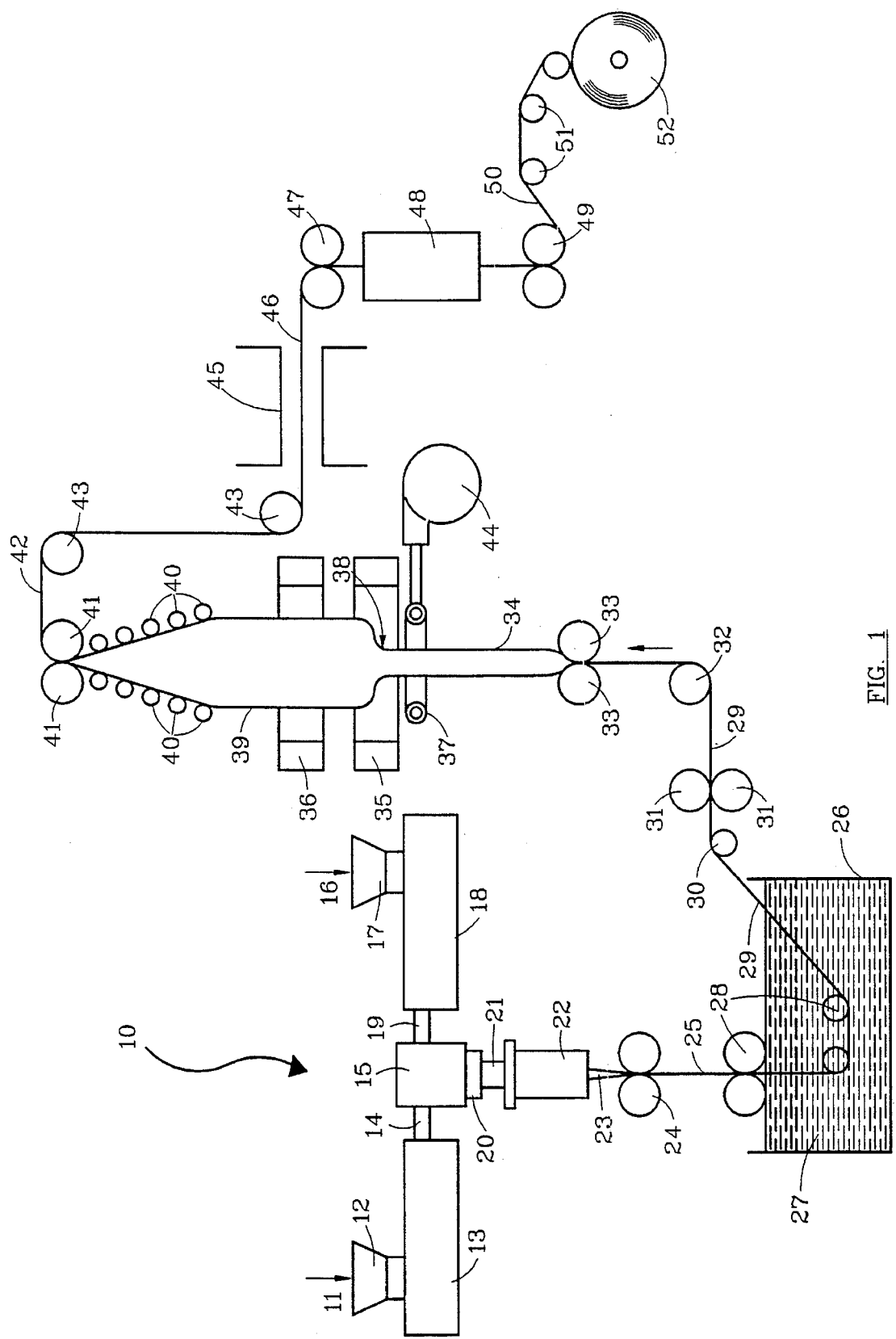
FIG. 1 is a schematic representation of a process for making oriented nylon multilayer films according to the present invention.
Figure 4:
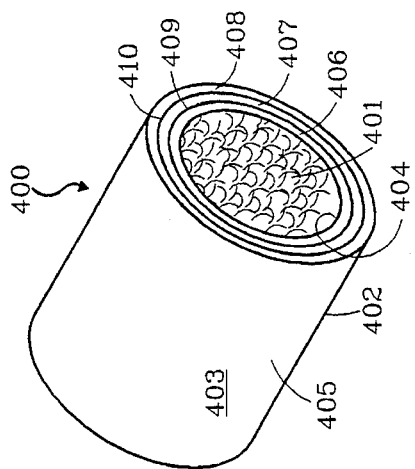
FIG. 4 is a sectional view of a multilayer film according to the present invention.

The invention in all of its embodiments comprises or utilizes a heat shrinkable, multilayer thermoplastic polymeric flexible film. Such films will have a thickness of about 4 mils (101.6 microns) or less, preferably less than about 3 mil (76.2 microns). Especially preferred for use as sausage casings are casings wherein the multilayer film has a thickness of between about 1 to 2.5 mils (25.4–63.5 microns). Such casings provide a beneficial combination of properties including ease of shirring and stuffing with low cost, good mechanical strength and good oxygen and water barrier properties.

The inventive article is a heat shrinkable multilayer film which must have at least three layers. These three essential layers are termed the inner layer, the core layer, and the outer layer. The inner layer and outer layer are disposed on opposing sides of the core layer. These three essential layers comprise the wall of the tube which in cross section has the inner layer disposed closest to the tube's interior surface with the outer layer disposed closest to the tube's exterior surface. It is contemplated that tubular films having more than three layers may be constructed and that such layers may be disposed as intermediate layers lying between the core layer and either or both of the inner and outer layers, or these additional layers may comprise one or more surface layers and comprise either or both the interior or exterior surface of the tube. Preferably, the polyamide inner layer will comprise the interior surface layer of the tube where in use it will contact a foodstuff encased by the tube. Advantageously, the inner layer polyamide as the interior surface layer will have the property of adhering to meat to provide a casing suitable for encasing sausages such as fleischwurst or liver sausage. Disadvantageously, multilayer casings disclosed in the prior art often utilize interior surface layer formulations which require special treatments such as electron beam irradiation or corona treatment to make the layer more adherent to meat. Beneficially, in the present invention the inner layer may be the interior surface layer and consist essentially of a meat adhering polyamide such as nylon 6/66 copolymer (preferably 85:15 wt. %) which does not require polymeric processing aids to facilitate orientation nor special treatments to enhance meat adhesion. It is also preferred that the polyamide outer layer will comprise the exterior surface of the tube. As the exterior surface layer of the tube, the polyamide outer layer is easily conditioned with water to facilitate stretch orientation. In one embodiment of the invention the multilayer casing article will comprise five layers with intermediate layers on either side of the core layer with these intermediate layers adhering the core layer to both the inner and outer nylon layers. In a preferred embodiment the core layer directly adheres to either or preferably both of the inner and outer polyamide layers and in a most preferred embodiment the film article consists essentially of three polymeric layers viz the inner layer, the core layer and the outer layer. This preferred embodiment provides a desirable combination of properties such as meat adhesion, moisture and oxygen impermeability, mechanical strength, and a smooth, nonwrinkled appearance in a heat shrinkable, multilayer casing which is delamination resistant and relatively easy to manufacture without requiring addition of processing aids or polymeric plasticizers to the polyamide layers.

Typical layer thicknesses for the inventive heat shrinkable film may be about 5–20% inner layer, 20–60% core layer and 30–70% outer layer, although films with differing layer ratio thicknesses are possible. The function of the inner layer is primarily to provide an adhering surface for contact with the food stuff which is typically sausage meat. In the present invention, to fulfill this function the thickness of the inner layer need not be great, but is preferably as low as possible for ease of processing. It is important that this inner layer be continuous over the inner surface of the tube and that it be extruded at a sufficient thickness to allow the desired degree of stretching without forming discontinuities in coverage. The inner layer of the present invention also provides good machinability and facilitates passage of the casing over shirring mandrels or stuffing horns without the necessity for addition of antiblock additives, polymeric plasticizers, or slip agents to the interior surface layer of the film.

Advantageously, the core layer functions as a water vapor barrier, and provides the film with the suppleness and proper modulus for good shirrability and orientation, and may also function to strongly adhere the outer layer to the inner layer. By utilizing a core layer with the aforementioned functions, the meat adhering oxygen barrier and mechanical strength properties of the polyamide containing layers are not impaired as in prior art films which seek to obtain all such functions in a single layer by blending. The thickness of the core layer may widely vary depending upon the performance properties sought e.g. with respect to water vapor barrier resistance, shrinkage values, ease of orientation, and delamination resistance.

The outer layer provides mechanical strength and acts as a gas barrier, particularly for oxygen. This outer layer is typically the thickest to provide support and impart strength to the casing wall in order to withstand stuffing, cooking, and handling pressures and abrasion.

In the present invention it is a fundamental concept that the inner and outer layers comprise polyamides and the core layer comprises a polyolefin and that the multilayer film be heat shrinkable having a shrinkage value at 90° C. of at least 10% in at least one direction (preferably in both machine and transverse directions). By utilizing a multilayer film, the present invention overcomes disadvantages in monolayer polyamide casings of the prior art which sacrifice one or more desired functions such as moisture or gas impermeability, dimensional stability, uniformity of diameter, wrinkle resistance or meat adhesion for other functions including those listed above as well as processability or ease of manufacture.

Polyamides are polymers having recurring amide (—CONH—) linking units in the molecular chain. Polyamides include nylon resins which are well known polymers having a multitude of uses including utility as packaging films, bags and casing. See, e.g. *Modern Plastics Encyclopedia*, 88 Vol, 64, No. 10A, pp. 34–37 and 554–555 (McGraw-Hill, Inc., 1987) which is hereby incorporated by reference. In particular, the novel thermoplastic flexible oriented multilayer films of the present invention are useful in food packaging. "Nylon" is a generic term for synthetic, high molecular weight ($M_n \geq 10,000$) linear polyamides. Suitable nylons are commercially available and may be prepared by well known methods including addition or self-condensation reactions e.g. of amino acids or lactams and condensation reactions of diamines with diacids. Nylon polymers may be aliphatic or aromatic. Suitable nylon polymers may be homopolymers or copolymers such as bipolymers and terpolymers, and blends and modifications thereof. It is contemplated that semicrystalline or amorphous nylon may be used.

It is further contemplated that blends of nylons may be employed and that blends of aliphatic nylons with aromatic nylons may be utilized. Preferred blends include blends of semicrystalline aliphatic nylons or a mixture of one or more semicrystalline aliphatic nylons with an amorphous nylon. A preferred amorphous nylon is nylon 6I/6T copolymer which is commercially available under the trademark Selar PA 3426 from the DuPont Company of Wilmington, Del., U.S.A.

Suitable nylons for use in either or both of the inner and outer polyamide layers are believed to include nylon 6, nylon 66, nylon 6,12, nylon 6/12 copolymer, nylon 6I/6T copolymer, and nylon 6/66 copolymer. Preferred polyamides are aliphatic nylons such as nylon 6, and copolymers thereof and especially preferred are aliphatic nylon copolymers such as nylon 6/66. Advantageously, both the inner and outer layers may comprise the same copolyamide of nylon 6/66 which exhibits highly desirable properties of meat adhesion as well as oxygen impermeability, mechanical strength properties and ease of stretch orientation.

The films of the present invention are biaxially stretched and oriented films. An important feature of the present invention is that the inventive films have sufficient shrinkage values and shrink forces to produce smooth wrinkle resistant casings able to closely conform to encased foodstuffs during heat processing, chilling, refrigeration and storage. Nylon polyamides are relatively difficult to biaxially stretch and orient, particularly as tubes, and most particularly as multilayer tubes. It has been found that suitable nylons will have a relative viscosity ($\eta_r$) in 98% sulfuric acid of at least about $4\eta_r$, preferably at least about $4.2\eta_r$. Polyamides having relative viscosity values below 4 have an undesirably low melt viscosity that makes it more difficult to be extruded and oriented as tubes. It is contemplated that polyamides having a relative viscosity less than 4 may be blended as a minor constituent (preferably less than 25%) with one or more polyamides having a relative viscosity of at least 4.

Both the inner layer and the outer layer should each comprise at least 60%, preferably at least 80%, more preferably at least about 90%, and most preferably at least 95% by weight of at least one polyamide which preferably has a relative viscosity of at least 4.0 in 98% sulfuric acid. Blends of polyamides may also be used in these amounts. Although it is not necessary for the present invention, additional processing aids, colorants, antiblock agents or adhesive components may be added to either or both of the inner and outer layers.

The multilayer film of the present invention has an inner layer comprising a polyamide, preferably nylon or a copolymer thereof. Especially preferred is nylon 6/66 copolyamide. Nylon 6 copolymers exhibit better meat adhesion than polyamides such as nylon 11 or nylon 12 and preferably the inner layer will consist essentially of a nylon 6 type polymer or copolymer such as nylon 6/66. This inner layer preferably is the interior surface layer of the tubular article and beneficially the composition of this layer will have the characteristic of adhering to meat. It is also desirable that the composition of the inner layer be such that it may adhere to a core layer which comprises at least 60% by weight of an ethylene polymer having at least one functional moiety. Advantageously, the inner layer will adhere to a fat containing and protein containing foodstuff such as meat encased thereby during and after heat processing or treatment such as is found in pasteurization and cooking, and will also adhere to the remainder of the multilayer film, preferably the core layer, sufficiently to prevent delamination. Preferably, the composition of the inner layer will allow for the inner layer's coextrusion as part of a multilayer film without detrimental delamination from any adjacent polymeric film layer during such operations as annealing, reeling, shirring, stuffing, cooking, refrigerating, and subsequent use. Advantageously, a primary function of the inner layer is as a meat adhering layer. A further function of this inner layer is that it should not block when the tube is collapsed upon itself, and should facilitate opening of the tube and passage thereof over equipment such as shirring mandrels and stuffing horns. Advantageously, the present invention utilizes a polyamide which does not require internally applied antiblock coatings or blended additives for machinability. If desired, lubrication may be imparted by dipping the casings (e.g. in the form of a shirred stick) into water for less than a minute prior to stuffing. Many prior art casings require longer periods of soaking in water of up to 30 minutes to not only facilitate stuffing, but to activate casing shrink properties to minimize wrinkling. The casings of the present invention do not require such activation to avoid wrinkles and water need be added, if desired, only for lubrication purposes; soaking is not required. The shrinkage properties of the present invention are activated by heat.

The multilayer film of the present invention has an outer layer comprising a polyamide. It is desirable that the outer layer be protected by the core layer from excessive moisture migration from encased foodstuffs which may impair the oxygen impermeability of the polyamide outer layer.

Although the outer layer need not be the outermost layer of the tubular casing, orientation is facilitated if it is the outermost layer because the outer layer may then easily be plasticized by contact with water as described below. It is known that water detrimentally increases the oxygen transmission of polyamides such as nylon 6 and its copolymers. However, the oxygen barrier properties desired in film casings used for packaging sausages such as fleischwurst and liver sausage are most critical during storage after cooking. Once cooked, the outer layer of polyamide in the present invention is believed to achieve a suitable, low moisture level in equilibrium with the surrounding atmosphere and is protected from the absorption of moisture from the interiorly encased sausage by the moisture barrier properties of the core layer.

Thus, in the inventive casing the polyamide outer layer functions as an oxygen barrier and provides in combination with the other layers a casing with a sufficiently low oxygen transmission rate to prevent or substantially delay oxidative defects such as discoloration of the encased sausage meat. The above noted nylons are suitable for use in the outer layer. In particular, nylon 6 has good oxygen barrier properties. However, nylon 6 is a stiff material having high secant and Young's modulus values making it difficult to process into film, especially biaxially stretch oriented film. Preferred are copolyamides of nylon 6 having between 80–90 weight percent nylon 6 which are easy to process while having good oxygen impermeability. Beneficially, the outer layer will comprise or consist essentially of a copolyamide of nylon 6 with nylon 66, preferably having a nylon 6 content of between about 80–90 weight percent and a nylon 66 content of up to 20% (preferably between about 10–20%). A most preferred polyamide copolymer is nylon 6/66 copolymer having its polymeric units derived from about 85% nylon 6 and about 15% nylon 66. This preferred copolymer beneficially has a low oxygen transmission rate and is easy to stretch orient; it also exhibits good meat adhesion. Advantageously, the same polyamide or combination thereof may be used for both the inner layer and the outer layer of the casing of the present invention.

Suitable materials for the core layer comprise polyolefins such as low density polyethylene (LDPE), high density polyethylene (HDPE), linear low density polyethylene (LLDPE), very low density polyethylene (VLDPE), copolymers of ethylene with at least one $C_3$–$C_{10}$ α-olefin, ionomer, and ethylene polymers having at least one functional moiety selected from the group of esters, anhydrides and carboxylic acids. Copolymers of ethylene with monomers providing a functional moiety on the copolymer are suitable such as copolymers of ethylene having at least one functional moiety selected from the group of esters, anhydrides, and carboxylic acids. Advantageously, these functional moieties provide desirable adhesive, softness, shrink and stretch orientation properties to the core layer. Blends of two or more functionalized polymers or copolymers are also contemplated and preferred. Random, block and graft copolymers of ethylene are further contemplated in the present invention.

Suitable core layer polymers and copolymers will be predominantly ethylenic in nature and copolymers will have at least 50 wt. %, desirably at least 70 wt. %, and preferably at least 85 wt. % of the copolymer's polymeric units derived from ethylene. Advantageously, ethylenic polymeric units are nonpolar and hydrophobic which impart moisture barrier properties to the core layer. Advantageously, ethylenic copolymers, in addition to polymeric units derived from ethylene monomer, will have at least about 3% by weight, preferably at least about 8% of its polymeric units derived from at least one other monomer. In one preferred embodiment of the invention, this other monomer comprises a $C_3$–$C_{10}$ (preferably $C_4$–$C_8$) alpha-olefin which is most preferably butene-1, hexene-1, octene-1, or a combination thereof. In those embodiments of the invention which employ a functional moiety, advantageously, the functional moiety of the ethylene polymer or copolymer will comprise at least about 3% by weight of said polymer or copolymer. Preferred polymers and copolymers have a functional moiety comprising 3 to 14 weight percent of the polymer or copolymer.

Suitable core layer polyolefins include homopolymers and copolymers of polyethylene and polypropylene, especially polyethylene including HDPE, LDPE, LLDPE, AND VLDPE.

Polyethylene is the name for a polymer whose basic structure is characterized by the chain $\{CH_2CH_2\}_n$. Polyethylene homopolymer is generally described as being a solid which has a partially amorphous phase and partially crystalline phase with a density of between 0.915 to 0.970 g/cm$^3$. The relative crystallinity of polyethylene is known to affect its physical properties. The amorphous phase imparts flexibility and high impact strength while the crystalline phase imparts a high softening temperature and rigidity.

Unsubstituted polyethylene is generally referred to as high density homopolymer and has crystallinity of 70 to 90 percent with a density between about 0.96 to 0.97 g/cm$^3$. Most commercially utilized polyethylenes are not unsubstituted homopolymer but instead have $C_2$–$C_8$ alkyl groups attached to the basic chain. These substituted polyethylenes are also known as branched chain polyethylenes. Also, commercially available polyethylenes frequently include other substituent groups produced by copolymerization.

Branching with alkyl groups generally reduces crystallinity, density and melting point. The density of polyethylene is recognized as being closely connected to the crystallinity. The physical properties of commercially available polyethylenes are also affected by average molecular weight and molecular weight distribution, branching length and type of substituents.

People skilled in the art generally refer to several broad categories of polymers and copolymers as "polyethylene." Placment of a particular polymer into one of these categories of "polyethylene" is frequently based upon the density of the polyethylene and often by additional reference to the process by which it was made since the process often determines the degree of branching, crystallinity and density. In general, the nomenclature used is nonspecific to a compound but refers instead to a range of compositions. This range often includes both homopolymers and copolymers.

For example, "high density" polyethylene (HDPE) is ordinarily used in the art to refer to both (a) homopolymers of densities between about 0.960 to 0.970 g/cm$^3$ and (b) copolymers of ethylene and an alpha-olefin (usually 1-butene or 1-hexene) which have densities between 0.940 and 0.958 g/cm$^3$. HDPE includes polymers made with Ziegler or Phillips type catalysts and is also said to include high molecular weight "polyethylenes." In contrast to HDPE, whose polymer chain has some branching, are "ultra high molecular weight polyethylenes" which are essentially unbranched specialty polymers having a much higher molecular weight than the high molecular weight HDPE.

Hereinafter, the term "polyethylene" will be used (unless indicated otherwise) to refer to ethylene homopolymers as well as copolymers of ethylene with alpha-olefins and the term will be used without regard to the presence or absence of substituent branch groups.

Another broad grouping of polyethylene is "high pressure, low density polyethylene" (LDPE). The polyethylene industry began in the 1930's as a result of the discovery of a commercial process for producing LDPE by Imperial Chemical Industries, Ltd. researchers. LDPE is used herein to denominate branched homopolymers having densities between 0.915 and 0.930 g/cm$^3$. LDPEs typically contain long branches off the main chain (often termed "backbone") with alkyl substituents of 2 to 8 carbon atoms on these branches.

Another type of polyethylene is Linear Low Density Polyethylene (LLDPE). Only copolymers of ethylene with alpha-olefins are in this group. LLDPEs are presently recognized by those skilled in the art as having densities from 0.915 to 0.940 g/cm$^3$. The alpha-olefin utilized is usually 1-butene, 1-hexene, or 1-octene and Ziegler-type catalysts are usually employed (although Phillips catalysts are also used to produce LLDPE having densities at the higher end of the range). LLDPEs typically do not have many long branches off the main chain as exhibited by LDPE. Another grouping of polyethylene is Very Low Density Polyethylene (VLDPE) which is also called "Ultra Low Density Polyethylene" (ULDPE). This grouping like LLDPEs comprise only copolymers of ethylene with alpha-olefins, usually 1-butene, 1-hexene, or 1-octene and are recognized by those skilled in the art as having a high degree of linearity of structure with short branching rather than the long side branches characteristic of LDPE. However, VLDPEs have lower densities than LLDPEs. The densities of VLDPEs are recognized by those skilled in the art to range between 0.860 and 0.915 g/cm$^3$.

VLDPEs may be made by solution processes or fluidized bed processes. European Patent Application 84 103441.6 having publication number 120503 (which is hereby incorporated by reference in its entirety into the present application) describes a suitable method for preparation of low density, low modulus ethylene copolymers utilizing a fluidized bed. These ethylene copolymers are described as having a density of less than 0.915 g/cm$^3$ and a 1% secant modulus of less than 140,000 kPa and are believed to be suitable for the present invention. VLDPEs of various densities are also commerically available from Dow Chemical Company of Midland, Mich., U.S.A. and Union Carbide Coporation of 20 Danbury, Conn., U.S.A.

VLDPE resins utilized in the present invention have a crystalline melting point which may be determined by differential scanning calorimetry (DSC) according to a method similar to ASTM D-3418 using a 5° C. per minute heating rate and a DuPont 9000 brand differential scanning calorimeter. Suitable VLDPE resins may be differentiated from elastomeric materials by measurement of crystalline melting point. The melting point of suitable resins is beneficially at least about 100° C. or higher and preferably greater than about 110° C. VLDPE resins useful in the present invention for food packaging typically have a melting point between 115° and 125° C.

Films of one embodiment of the present invention utilize VLDPE resins which have a Vicat softening point greater than about 60° and preferably greater than 75° C. A Vicat softening point between about 75° and 100° C. is preferred. Materials having lower Vicat softening points are elastomeric rubber-like compositions which are disadvantageously difficult to dimensionally control during biaxial stretching, although such elastomers may be useful in a blend with VLDPE or other ethylene polymers or copolymers.

Advantageously, the melt index (as measured by ASTM D-1238, Condition E) of the predominant (>50% by weight) core layer polyolefin will be less than 2.0 dg/min with a melt index of 0.1 to 1.0 dg/min. preferred. In one preferred embodiment VLDPE having a melt index of 0.1 to 0.3 dg/min. is utilized.

Blends of VLDPEs may be employed such as those disclosed in U.S. Pat. No. No. 5,032,463 which is hereby incorporated by reference.

Suitable VLDPE terpolymers useful in the present invention are made from copolymerization of ethylene with either 1-butene, or 1-hexene, and at least one $C_6$–$C_8$ alpha-olefin. Suitable $C_6$–$C_8$ alpha-olefins include: 4-methy-1-pentene, 1-hexene, and 1-octene. A preferred terpolymer comprises a VLDPE copolymer of ethylene, 1-butene and 1-hexene (hereinafter termed $C_2C_4C_6$VLDPE terpolymer). Suitable VLDPE terpolymers are further disclosed in European Patent Publication No. 374,783 (U.S. Pat. No. application Ser. No. 07/892,637) which are hereby incorporated in their entireties by reference.

A most preferred VLDPE is a terpolymer of ethylene, 1-butene, and 1-hexene, having a reported density of about 0.912 g/cm$^3$ and melt index of about 0.18 dg/min. which is sold by Union Caribe Corporation (UCC) of Danbury, Conn. under the trademark FLEXOMER Polyolefin DEFD-1192 Natural 7.

Suitable core layer copolymers of ethylene and esters include copolymers of ethylene and unsaturated esters especially vinyl esters.

Suitable core layer copolymers include ethylene-vinyl acetate, ethylene-methyl methacrylate, ethylene-ethyl methacrylate, and ethylene-alkyl acrylates such as ethylene-methyl acrylate, ethylene-ethyl acrylate and ethylene-butyl acrylate.

Suitable vinyl ester content of such copolymers used in the present invention include 4–28 weight percent vinyl ester based on the total copolymer weight.

A most preferred EVA of the present invention comprises a copolymer of ethylene and vinyl acetate such as that sold by the Union Carbide Corporation of Danbury, Conn. under the brand designation DQDA 6833 with the following reported properties, a density of 0.933 g/cm$^3$, a vinyl acetate content of 10 wt. %, and a melt index of about 0.25 dg/min.; it is further contemplated that a blend of at least two different copolymers of ethylene and at least one unsaturated ester may be employed. Most preferred are vinyl ester copolymers of ethylene and especially preferred are the ethylene-vinyl acetate (EVA) copolymers. Many different EVA resins are commercially available having a wide range of vinyl acetate contents and melt flow indices.

VLDPEs and ethylene ester copolymers beneficially facilitate orientation and provide good adhesion and moisture barrier properties as well as shrink and shrink force properties which promote wrinkle resistance. Additionally, these materials provide suppleness and proper modulus to enable the inventive tubular films to be easily shirred and deshirred without undesirable breakage.

Suitable polymers of ethylene having an anhydride functionality include copolymers of ethylene and a vinyl ester such as vinyl acetate wherein the copolymers are modified with an anhydride functionality such as maleic anhydride. These polymers may function as indicated above for ester copolymers, particularly as an adhesive to hold the inner and outer layers to the core layer without delamination during manufacture and use.

Exemplifying such polymers and copolymers are materials such as the ethylene based polymers containing anhydride functionality which are commercially available from Quantum Chemical Corporation under the trademark Plexar.

Suitable polymers of ethylene having a carboxylic acid functionality include copolymers of ethylene and carboxylic acids such as methacrylic acid, ethylacrylic acid. Preferred copolymers are ethylene-methacrylic acid (EMAA). These polymers having a carboxylic acid functionality may function as described above with respect to the ester copolymers, but are believed particularly useful for their adhesive properties to prevent delamination.

A suitable carboxylic acid content of an ethylene copolymer having a carboxylic acid functionality include 8–16 weight percent based on the total copolymer weight. A preferred copolymer is an ethylene-methacrylic acid copolymer sold by DuPont Company under the trademark NUCREL 1202HC and which has a reported typical melt index of 1.5 dg/min., a methacrylic acid content of 12.0%, a melting point of 99° C., and a Vicat softening point of 75° C. The NUCREL 1202HC polymer is further described in a Product Information Brochure for blown and cast film No. H-23752 which is hereby incorporated by reference.

The core layer should comprise at least 60%, preferably at least 80%, and most preferably at least 90% by weight of at least one polyolefin as described above. Preferably, a blend of (A) a polyolefin especially a VLDPE or a copolymer of ethylene and a vinyl ester such as EVA with (B) a copolymer of ethylene and a carboxylic acid such as ethylene methacrylic acid copolymer (EMAA) will be employed.

In a preferred embodiment of the invention, the core layer comprises at least 50% by weight of VLDPE or ethylene vinyl acetate copolymer blended with at least 10% by weight of ethylene methacrylic acid copolymer. Embodiments of the invention having a core layer which consists essentially of a blend of VLDPE or EVA, and EMMA are relatively easy to manufacture and exhibit favorable combinations of properties. Advantageously, VLDPEs such as ethylene/1-octene VLDPE copolymers sold by Dow Chemical Company under the trademark Attane, or ethylene/1-butene/1-hexene VLDPE terpolymers sold by UCC under the trademark FLEXOMER, or EVA copolymers having an $\alpha$-olefin or VA content of between about 4.5 to 12% and/or a melt index less than 1 dg/min., preferably between about 0.1 and 0.7 dg/min. as measured by ASTM D-1238, condition E are employed. Furthermore, with respect to blends of A and B, component B is believed to provide a strong adhesive character to the core layer which facilitates orientation and prevents delamination during manufacture (e.g. orientation, reeling, shirring) and use (e.g. stuffing, linking, cooking, chilling and slicing). Component A excels in providing a desirable combination of shrink, shrink force, modulus and moisture barrier properties.

Beneficially, a blend of copolymer A with copolymer B, as described above, would be in a weight ratio of A:B of from about 9:1 to 3:2, preferably about 7:3 or higher. At higher A:B ratios it is believed that the core layer is less adhesive, while at lower ratios the film tends to be stiffer and have higher material costs. Preferably the core layer will comprise at least 75–80 weight % of a polyolefin, particularly an ethylene polymer or copolymer and it is especially preferred that at least 90 weight % of the core layer will be such polymer. In a preferred embodiment the core layer comprises about 70% of a VLDPE such as DEFD 1192 or an EVA such as DQDA 6833, and 30% of an EMAA such as Nucrel 1202.

The core layer may also contain other additives including colorants and processing aids, preferably in amounts less than about 20%, most preferably less than 10% by weight.

It is contemplated that the film casing of the present invention will be primarily utilized to process and/or encase food products, particularly fat and/or proteinaceous food products, during and after heat treatment such as is present during pasteurization and cooking and therefore the materials utilized should all be suitable for use in food packaging.

The multilayer film of the present invention is an oriented film which may be stretch oriented in one or more directions, preferably biaxially oriented by biaxial stretching in which the film is stretched in two directions which are preferably at 90° to one another.

It is important that the casings have at least 10% shrinkage in at least one direction, preferably in both M.D. and T.D. directions and to have sufficient shrink force to ensure good conformation of the casing to enclosed foodstuffs. In one embodiment of the invention, casings have a shrinkage value at 90° C. of at least 20% or higher and/or a shrink force at 90° C. of at least 30 Kg per cm, in at least one and preferably both the M.D. and T.D. directions to provide wrinkle resistance. Simultaneous with the filing of this application the present inventor, S. J. Vicik, has filed a related application U.S. Ser. No. 07/949,228, and filed Sep. 23, 1992 now abandoned, entitled "HEAT SHRINKABLE NYLON FOOD CASING HAVING A FUNCTIONALIZED ETHYLENIC POLYMER CORE LAYER", which application is hereby incorporated by reference in its entirety. This related application primarily addresses and claims multilayer polyamide casings having a functionalized core layer.

Biaxial orientation by biaxial stretching increases the tensile strength of films and decreases the percentage of elongation at break. Advantageously, the multilayer films of the present invention exhibit excellent mechanical strength. For most applications it is preferable that the multilayer casings of the present invention have a tensile strength of at least 15,000 psi (103 MPa) in at least one direction (preferably in both the machine and transverse directions) at room temperature (about 23° C.) for machinability, ease of shirring, stuffing, clipping and handling, the inventive films should not be too stiff. Beneficially, inventive casings may be produced having a secant modulus value at 1% of about 200,000 psi (1379 MPa) or less, preferably less than about 150,000 psi (1034 MPa).

Preferably, the oxygen gas transmission rate of the multilayer casing will be less than 75 $cm^3$ per $meter^2$ per 24 hours at 1 atmosphere and 23° C., and most preferably less than 50, in order to prevent or substantially delay oxidative defects including discoloration. Liver sausage, in particular, has a tendency to turn an undesirable green color with exposure to oxygen.

Preferably, the water vapor transmission rate of the multilayer casing will be less than 75 grams per $meter^2$ per 24 hours at 100° F. (37.8° C.) under ambient pressure believed to be about 1 atmosphere, and most preferably less than 50, in order to prevent or ameliorate defects attributable to excessive moisture transfer across the casing wall. Such defects include impairment of the oxygen barrier properties of the outer polyamide layer by transfer of moisture from an encased food product, variations in cooking yield, and sensory defects e.g. in texture and palatability of an encased foodstuff.

General equipment and procedures similar to those described in Pahlke U.S. Pat. No. 3,456,044 may be employed in the present invention as modified as disclosed herein. Other orientation and stretching apparatus to uniaxially or biaxially stretch film are known in the art and may be adapted by those skilled in the art to produce films of the present invention. Examples of such apparatus and processes are believed to include e.g. those disclosed in U.S. Pat. Nos. 3,278,663; 3,337,665; 4,590,106; 4,760,116; 4,769,421; 4,797,235; and 4,886,634.

The inventive film may be made using a method for biaxially orienting thermoplastic films, in which a primary tube is formed by melt extruding a tube from an annular die. The primary tube can be made by any of the known techniques for extrusion of tubular plastic film including coextrusion and coating lamination methods. This extruded tube is cooled, collapsed, and then inflated between first and second means for blocking the interior of the tube which means are set apart from one another to form an isolated fluidic mass or bubble, and the inflated tube is advanced through a heating zone to bring the tube to its draw temperature. In a draw or orientation zone the tubing is radially expanded in the transverse direction and pulled or stretched in the machine direction at a temperature such that expansion occurs in both directions (preferably simultaneously)— the expansion of the tubing being accompanied by a sharp, sudden reduction of thickness at the draw point. The term heating zone is used to define a region which includes both a zone of preliminary heating of the primary tubing to the draw temperature and also the draw or orientation zone.

In the present invention the tubing may be biaxially stretched by passing the tubing through a heating zone and rapidly radially extending the tubing when the tubing is at the draw temperature. The extended tubing is contacted with a stream of cooling fluid, while extended in the heating zone, and the temperature of the cooling fluid at least at one point within the heating zone, is substantially below the temperature to which the tubing has been heated during its flow through the heating zone up to said at least at one point within said heating zone. The temperature of the cooling fluid in the draw zone is at least 10° F. (5° C.) below that of the tubing at the draw point. Preferably the cooling fluid is air, and a stream of high velocity air is blown in a generally upward direction, toward the radially extended portion of the tubing.

A preferred process of the present invention is a continuous process for making a tubular, biaxially stretched, heat shrinkable multilayer thermoplastic food casing. This process may comprise:

(a) coextruding a melt plastified multilayer thermoplastic tube having an exterior surface and an interior surface through an annular die wherein the tube comprises an inner polyamide layer and an outer polyamide layer with a core layer between the inner and outer layers of at least one polyolefin;

(b) cooling the coextruded tube below the melting point of each layer by applying water to the exterior surface of the tube;

(c) transferring the cooled tube to an orientation zone wherein the tube is reheated to a temperature below the melting point of each tube layer followed by cooling while a fluid mass is admitted to the interior of the tube as said tube is passed between first and second means for blocking fluid flow along the interior of the tube thereby causing the tube to stretch circumferentially about the entrapped fluid mass and simultaneous with the circumferential stretching, the tube is stretched in a direction perpendicular thereto to produce a biaxially stretched tubular film; and (d) annealing the biaxially stretched film at elevated temperature to dimensionally stabilize the film thereby producing a multilayer film having a shrinkage value at 90° C. of at least 20% or higher in at least one and preferably both the M.D. and T.D. directions.

Referring now to the drawings, FIG. 1 depicts a schematic view of a process 10 which according to the present invention may be utilized to produce a multilayer, stretch oriented flexible, heat-shrinkable film. In the depicted process 10 a polyolefin (such a VLDPE or EVA or a blend thereof with EMAA) resin 11 is placed in hopper 12 of a screw-type extruder 13 wherein it is heated to an appropriate temperature above the melting point of the polymer to cause the melting thereof. The extruder may be provided with a jacketed chamber through which a heating medium is circulating. The rotation of a screw within the extruder 13 forces melt plastified polymer through a connecting pipe 14 into a coextrusion die 15.

Simultaneous with the introduction of the melt plastified polymer 11 to the die 15, a first polyamide resin 16 (which has been placed in a hopper 17 of a second extruder 18) is similarly heat plastified and forced through a pipe 19 to coextrusion die 15. A second polyamide resin is similarly introduced to die 15 through a third extruder (not shown). In a preferred embodiment of the present invention, three extruders are utilized to produce the three film layers. However, in the coextrusion art it is known that where the same polymer melt is used in more than one layer of a multilayer construction, that the melt from one extruder may be divided e.g. at the die and used for multiple layers. In this manner a tubular five layer film of the invention for example, may be made utilizing three or four extruders.

The coextrusion die 15 has an annular, preferably circular, opening 16 and is designed to bring together the polyamide and polyolefin polymer melts to form a multilayer polymeric melt having inner and outer layers of polyamide separated by a core layer of polyolefin resin 11. This multilayer melt is coextruded out of the annular die opening 20 as a primary tube 21. Beneficially, the die 15 may be equipped, as is known in the art, with a central orifice (not depicted) through which a fluid such as air is typically introduced. The extruded primary tube is cooled by passage through a cooling ring or chamber 22 where a coolant, preferably water, passes therefrom through e.g. perforations onto the exterior surface of the primary tube 21. The stream of cooling water constitutes a cooling zone serving to chill or set the extruded plastic tube to the desired temperature. The cooled primary tube 23 is drawn through cooling ring 22 by nip rolls 24 which may also serve to collapse the tube which can be reeled and then separately oriented or can be oriented in line as shown in FIG. 1. For making casings suitable for use to process sausages such as fleischwurst and liver sausage, primary tubes having a typical flat width in the range of about 1.5–1.75 mil (38–44 mm) and a typical wall thickness in the range of about 10–20 mil (254–508 mm) may be produced. Advantageously, according to the present invention, this multilayer primary tube may be extruded, cooled and collapsed without resorting to use of vacuum chambers or complicated equipment such as that disclosed in U.S. Pat. No. 4,886,634 to control the primary tube dimensions prior to orientation.

Throughout this description reference is made to use of nip rolls which function to either or both pull or transport the tube and also to collapse an expanded tube to a flattened condition. However, it will be apparent to those skilled in the art that other transport means and collapsing means may be employed and are known in the art including such apparatus as collapsing ladders, drive belts, and the like and use of such mechanisms is contemplated by the present invention. Furthermore, it will be appreciated by those skilled in the art that such parameters as the die opening diameter, nip roll speed, amount of fluid introduced and captured between the die and nip rolls, and rate of flow of extrudate from the die opening may all be adjusted to optimize process conditions. For example, the circumference or flat width of the primary tube may be decreased, increased or kept the same as the die gap opening by modification of one or more of the above parameters. Similarly, the primary tube may be conditioned or modified e.g. by interior, internal and/or external application and variation of the types and amounts and characteristics of materials, including gaseous or liquid fluids contacted therewith as well as setting and changing such parameters as pressures and temperatures. It will be understood in the art that such parameters may vary and will depend upon practical considerations such as the particular polymer resins comprising the tube as well as the presence or absence of modifying agents, the equipment utilized, and desired rates of production, desired tube size (including diameter and thickness), the quality and desired performance characteristics of the tubular article for the use intended.

Referring again to FIG. 1, the primary tube is optionally exteriorly conditioned with water just before orientation and in a preferred embodiment the nip rolls 24 transfer a flattened primary tube 25 into an open tank or bath 26 of temperature controlled (preferably at least about 30° C. or higher) water 27 via a series of guide rollers 28. The exterior surface of immersed tube 29 is preferably a polyamide outer layer which absorbs water preferably to a level less than 1.0%, but greater than 0.1%. Water is believed to plasticize the polyamide layer and facilitate orientation. The water treated tube 29 travels out of water bath 26 over guide means such as roll 30 through nip rolls 31 which may draw the tube 29 from the tank and guide it for further processing e.g. about guide roll 32 to nip rolls 33.

Figure 2:
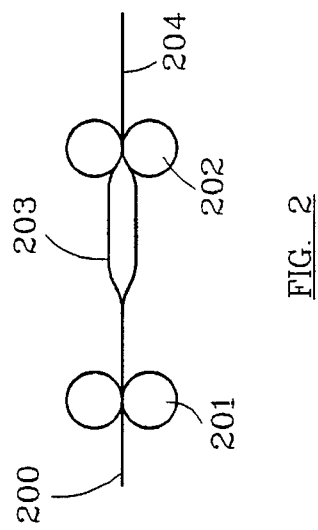
FIG. 2 is a schematic representation of an optional internal liquid conditioning step in the process of FIG. 1.

The process of the invention may optionally provide for internal conditioning of the primary tube e.g. with water. Internal treatment may be by enclosure within the tube of solutions including liquids such as water, or dispersions, or aqueous suspensions of e.g. talc. Referring now to FIG. 2, a primary tube 200 travels through a first set of blocking means such as nip rolls 201 and then through a second set of blocking means such as nip rolls 202 whereby a liquid mass, preferably comprising water, may be trapped or held captive within and contacting the interior surface of the tube thereby forming a water enclosing expanded tube 203. The second set of nip rolls 202 collapses the expanded tube and removes an interiorly liquid treated flattened tube 204 from the treatment zone. Such treatment of the interior surface of the primary tube may be performed at various locations between the cooling ring 22 of FIG. 1 and nip rolls 33. Such treatment may be either before, during, or after an optional exterior treatment with bath 26 described above. Interior treatment of the tube, with e.g. water may be particularly beneficial where the interior surface layer of the tube comprises a polyamide. Water is believed to plasticize nylon and facilitate stretching and orientation of nylon films. The process and films of the present invention contemplate their manufacture with or without exterior and/or interior conditioning of the primary tube with liquids e.g. water. Of course if such treatments are utilized, then the temperatures and pressures of the liquids employed may be controlled e.g. to facilitate absorption of the liquid. Interior treatment of the tube with antiblock additives may be advantageous where e.g. the tube is to be oriented out of a hot water bath designed to bring the tube to its draw-point temperature as it exits the bath. Advantageously, heat shrinkable, biaxially stretched multilayer film made according to the present invention may be made without any interior treatment of the primary tube with either water or antiblock additives.

Referring again to FIG. 1, to orient in line the flattened primary tubing 29 passes through driven nip rolls 33, then is reinflated to form a secondary expanded tube or bubble 34 which is drawn vertically upward through cylindrical radiant heaters 35 and 36, whereby the tube 34 is reheated to a temperature at which the film becomes drawable and orients when stretched but below the temperature at which the film merely thins out when stretched without appreciable orientation.

The surface of the tubing is cooled during its upward travel through the heater system, by air which is drawn into the heater zone due to a chimney effect and because of an aspiration effect caused by air blown through the air ring 37 as more fully described hereinafter.

The heated tubing 34 under internal pressure expands suddenly at draw point 38 forming a transversely stretched and inflated bubble or tube 39. This stretched bubble 39 then contacts a collapsing ladder comprising a series of converging rolls 40 and is flattened by driven nip rolls 41. The peripheral speed of nip rolls 41 is greater than that of nip rolls 33 in order to either pick up slack formed during biaxial stretching or to impart additional machine direction stretch. Thus, the desired orientation of the film is produced during its passage through the apparatus in an orientation zone between the nip rolls 33 and 41 (machine direction) as well as transversely thereto (transverse direction). After passing through nip rolls 41 the flattened tubing 42 is passed over suitable guide rolls 42 and may be wound up on a wind-up reel; the tension of which is controlled. If sheeting is desired, the tubing may be slit after passing through the nip rolls 41.

The temperature control of the orientation zone may be provided, for example, by a cylindrical radiant heater system comprising one or more (hereinafter termed a plurality) of radiant heaters 35 and 36 spaced apart from each other. Each of such heaters include a series of electrical resistance elements equally spaced about the circumference of the heater and controlled by a known transformer type control (not shown). The internal circumference of each radiant heater is preferably faced with screening behind which are placed the heating elements. The diameters of the cylindrical annular radiant heaters are sufficiently large to allow the tubing in its radially distended condition to pass therethrough with clearance.

As above indicated, an essential element of the invention is the provision of a stream of high velocity coolant such as air which is introduced below or between the heaters 35 and 36 by means of an air ring 37, supplied with air by a compressor or blower 44. Thus, as the tubing 34 advances to the nip rolls 41, it is surrounded by an upwardly moving stream of air. This stream of air is composed in part of ambient air which may be humidity controlled or cooled e.g. by air conditioning and which air may be blown in or drawn inwardly around the tubing 34 by the upward movement of the tubing, by the chimney effect of radiant heaters and partly by air induced by the passage of the high velocity stream emanating from the air ring 37. The heaters are situated and adjusted so that the air stream always remains at a temperature below that of the tubing in the draw zone, thus serving to control the temperature of the tubing and to prevent overheating of the tubing in the draw zone.

The orientation zone, particularly around the heating zone and draw zone may also be enclosed to minimize environmental disturbances and control such parameters as temperature, pressure, humidity, and composition and flow of the surrounding atmosphere.

The air ring, may be equipped with a plurality of holes or a slot orifice. The angle which the coolant exiting the air ring forms with the axis of the upwardly moving tubing and the heater system is important only in so far as it is necessary that the high velocity stream be directed in a generally upward direction.

The flow of surrounding air, in the orientation zone due to passage of the tubing and due to the chimney effect, introduces air below the heater 35 and between heater 35 and 36.

The volume of air delivered by blower or compressor 44 need not be large in comparison to the aforementioned air flows. The flow of air induced by the high velocity air stream in combination with the other air flows including e.g. cooled air conditioned air produces the desired cooling effect.

The tubing 34 is thus cooled by the upward flow of air during its ascent through the heater system in the orientation zone.

It is preferred to rapidly cool the expanded tubing to produce film having maximum shrinkage.

Additional air rings can be provided, in order to rapidly cool the tubing and stabilize the air flow and bubble if so desired. An exhaust system may also be added to withdraw heated air, and further contribute somewhat to the upward flow of air through the heater system because of its vacuum effect.

In the event that the percent shrinkage of the film at a particular temperature is in excess of the desired amount, the film can be annealed in any manner as well known in the art. U.S. Pat. No. 3,076,232 and 3,022,543 for example, are directed to annealing operations.

Optionally and preferably the stretched film is annealed in-line to dimensionally stabilize the film in one or more directions. The flattened film may be passed through a radiant heater 45 whose temperature and exposure time are controlled, the annealed film 46 being pulled by nip rolls 47. The relative speeds or diameters of nip rolls 41 and 47 may be adjusted to provide the desired tension to facilitate annealing and allow a predetermined decrease in tubing dimensions if desired.

Figure 3:
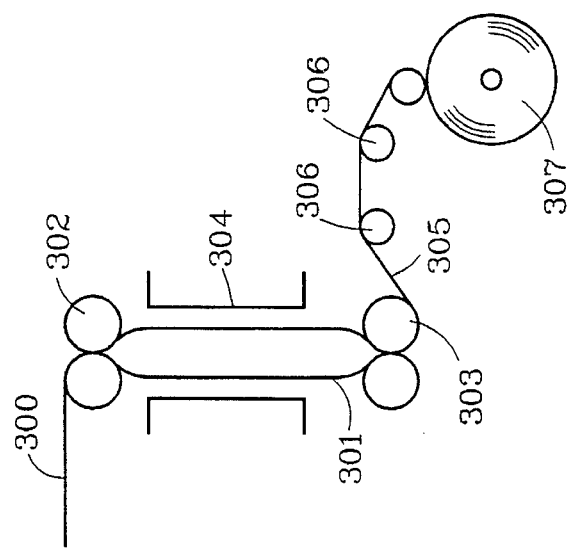
FIG. 3 is a schematic representation of an optional annealing step in the process of FIG. 1.

Referring now to FIG. 3, in an optional annealing operation the stretch oriented film tube 300 can be reinflated to form a bubble 301, between nip rolls 302 and 303 thus putting the tubing under a controlled tension in either or both of the machine and transverse directions. The tubing is heated by means of a radiant heater 304 which heats the tubing to the annealing temperature while the tubing is maintained in the expanded condition. The degree of transverse tension can be regulated by varying the degree of inflation of the bubble 301 while machine direction tension is regulated by controlling the relative speeds of the pairs of nip rolls 302 and 303. Alternatively or additionally, temperature controlled water may be sprayed onto the tubular film, thereby carrying out the heat-treatment while making at least the outermost layer, (preferably a polyamide) absorb water. At this time, it is preferable to make the speed of the second set of nip rolls 303 slower than the speed of the first set of nip rolls 302 e.g. by 1 to 5%, and it is preferable to adjust the pressure of the enclosed air so that the flat width of the collapsed film is reduced e.g. about 5 to 15% after annealing from the pre-annealed values. The heat-treated annealed film 305 may be passed via guide rolls 306 and wound around winding reel 307, preferably under low tension, to obtain a heat-shrinkable multilayer film according to the present invention. This optional annealing step may be performed in-line in place of the above mentioned flat film annealing. Annealing may also be done by unreeling, heat and/or water treating the previously stretched film followed by re-reeling of the annealed casing.

Referring again to FIG. 1, the oriented biaxially stretched film 46 may optionally have the moisture content, particularly of the outer layer, adjusted by pulling the film 46 through a humidification or water spray chamber 48 via a pair nip rolls 49. In chamber 48 the film is subjected to a controlled amount of humidity and the temperature and time of exposure may also be controlled. Humidification may be used to further condition the film to provide for or enhance film properties such as dimensional stability. The remoisturized film 50 is then passed via guide rolls 51 to a reel 52 where it is wound, preferably under low tension, for subsequent use. The wound film may be used as is, or printed, cut into predetermined lengths, or shirred, all according to methods known in the art.

In forming oriented films according to the present invention it will be recognized by those skilled in the art that in the orientation zone it is most desirable to uniformly control the temperature about the circumference of the tubing. Preferably the heating elements are uniformly spaced about the circumference of the heaters and the passage of the tubing is aligned to pass through the center thereof.

Certain non-uniformities in processing, such as variation in film thickness, unequal heating of the surface of the tubing, non-uniform air flows, and the like can be obviated by rotation oscillation, either alone or in combination, of the heater system, the air ring, or tubing with respect to the vertical axis of the tubing.

It is understood in the art that one of the critical aspects of forming biaxially oriented film is control of the temperature of the film in the draw or expansion zone. One method continuously envelops the primary tubing and the tubing material in the draw or expansion zone with a stream of coolant at a temperature below that of the film in the draw zone. As shown above, this is accomplished by the introduction of a stream of high-velocity air in the heating zone adjacent to the ascending column of tubing. The exact location of the point of introduction of such stream can vary somewhat and can be easily ascertained with simple empirical tests depending upon the size of the tubing being handled, the degree of thinning of wall section to be accomplished, the nature of the material being treated, and the dimensions of the heating zone, to name several factors. However, as a general guide, it may be stated that the air stream must not be introduced so closely to the draw zone as to destroy the physical stability of the tubing, that is to cause it to vibrate or "wobble." Furthermore, it will be apparent that if benefit is to be obtained from the air stream, it must not be placed so far away from the draw zone that its velocity at the time of impingement has dropped to no greater than would be achieved as a result of the chimney effect. In the experimental work in connection with the invention, it has been found that the preferred location for the introduction of the high velocity air stream is at the beginning of the heating zone. It is to be understood that a plurality of air rings can be used if necessary to control the fluid coolant temperature. It should also be understood that other methods of reducing the fluid temperature can be used, such as blowing cooled or ambient air into the desired area, using a cooling ring in the path of the fluid stream, withdrawing heated fluid and replacement with lower temperature fluid.

It should be further understood that, although the use of a plurality of cylindrical heaters has been described, the heater system can be, in effect, one heater with individually controlled zones and having vents along its length through which air or other coolants can flow. The length of the heater system and the number of heaters (or individually controlled units) employed will depend upon the particular operating conditions and is not narrowly critical.

It should also be understood that while manufacture of oriented film has been described above with respect to a coextrusion process which utilized vertical upward transport of the tube during orientation, that those skilled in the art may orient while transporting the tube in other directions including vertical downward orientation as known in the art and may also use coating lamination wherein at least one of the layers is coating laminated.

Referring now to FIG. 6 a perspective view of a segment of a cut open encased, heat processed, fat containing and protein containing foodstuff such as sausage 400 is depicted. The sausage meat 401 is encased by and fills a tubular film casing article 402 of the present invention. The casing 402 is a tube having an exterior surface 403 and interior surface 404 forming a tube wall 405. The thickness of the casing tube wall 405 is exaggerated for clarity. The present invention has at least three essential layers; an inner layer 406 of a polyamide which preferably forms the interior surface 404 which is in direct contact with and adhers to the meat 401; a core layer 407 of a polyolefin such as an ethylene polymer or copolymer or blends thereof; and an outer layer 408 of a polyamide which preferably forms the exterior surface 403 of the casing of the casing 402. Preferably, the core layer 407 directly contacts and adheres to inner layer 406 at an interface 409 which is coextensive with the outer surface of the inner layer and the inner surface of the core layer. It is also preferred that the core layer 407 directly contact and adhere to outer layer 408 at interface 410 which is coextensive with the outer surface of the core layer 407 and the inner surface of the outer layer 408.

The orientation of multilayer films may improve certain physical properties of the films as well as create films which are heat shrinkable. Also, the film may be stretched in one direction only, or stretched sequentially (e.g. in the machine direction (M.D.) first, followed by transverse direction (T.D.) stretching) or simultaneously stretched in both machine and transverse directions.

The following are examples and comparative examples given to illustrate the present invention.

Experimental results of the following examples are based on tests similar to the following test methods unless noted otherwise.

Tensile Strength: ASTM D-882, method A

% Elongation: ASTM D-882. method A

1% Secant Modulus: ASTM D-882, method A

Oxygen Gas Transmission Rate ($O_2$GTR): ASTM D-3985-81

Water Vapor Transmission Rate (WVTR): ASTM F 1249-90

Elmendorf Tear Strength: ASTM D-1992

Gauge: ASTM D-2103

Shrinkage Values: Shrinkage values are defined to be values obtained by measuring unrestrained shrink at 90° C. for five seconds. Four test specimens are cut from a given sample of the film to be tested. The specimens are cut into squares of 10 cm length in the machine direction by 10 cm. length in the transverse direction. Each specimen is completely immersed for 5 seconds in a 90° C. water bath. The specimen is then removed from the water bath and the distance between the ends of the shrunken specimen is measured for both the M.D. and T.D. directions. The difference in the measured distance for the shrunken specimen and the original 10 cm. side is multiplied by ten to obtain the percent of shrinkage for the specimen in each direction. The shrinkage for the four specimens is averaged for the M.D. shrinkage value of the given film sample, and the shrinkage for the four specimens is averaged for the TD shrinkage value.

Shrink Force: The shrink force of a film is that force or stress required to prevent shrinkage of the film and was determined from film samples taken from each film. Four film samples were cut 1" (2.54 cm) wide by 7" (17.8 cm) long in the machine direction and 1" (2.54 cm) wide by 7" (17.8 cm) long in the traverse direction. The average thickness of the film samples was determined and recorded and a strip chart recorder was calibrated at 0 gram and at 1,000 grams full scale load. Each film sample was then secured between the two clamps spaced 10 cm apart. One clamp is in a fixed position and the other is connected to a strain gauge transducer. The secured film sample and clamps were then immersed in a silicone oil bath maintained at a constant, elevated temperature for a period of five seconds. During this time, the force in grams at the elevated temperature was read from the strip chart and this reading was recorded. At the end of this time, the film sample was removed from the bath and allowed to cool to room temperature whereupon the force in grams at room temperature was also read from the strip chart and recorded. The shrink force for the film sample was then determined from the following equation wherein the results is obtained in grams per mil of film thickness (g/mil):

$$\text{Shrink Force (g/mil)} = F/T$$

wherein F is the force in grams and T is the average thickness of the film samples in mils.

In all the following examples, unless otherwise indicated herein the film compositions were produced generally utilizing the apparatus and method described in Pahlke U.S. Pat. No. 3,456,044 which describes a coextrusion type of double bubble method and in further accordance with the detailed description above. All percentages are by weight unless indicated otherwise.

EXAMPLES I–III

In Examples I–III, three biaxially stretched, heat shrinkable, multilayer films of the present invention were made. The layers of each multilayer film were coextruded and biaxially stretched according to a coextrusion type of tubular orientation process.

Examples I–III are three layered films. However, films of four or more layers are contemplated by the present invention. The inventive multilayer films may include layers to add or modify various properties of the desired film such as heat sealability, meat adhesion, shrinkability, wrinkle resistance, puncture resistance, printability, toughness, gas or water barrier properties, abrasion resistance and optical properties such as gloss, haze, freedom from lines, streaks or gels. These layers may be formed by any suitable method including coextrusion, extrusion coating and lamination.

For Examples I–III, one extruder was used for each layer and the heat plastified resins from each extruder were introduced to a coextrusion die from which the resins were coextruded at a first outer: core: second outer layer ratio of about 53:35:12.

In Examples I–III, for each layer, the resin or resin mixture was fed from a hopper into an attached standard single screw extruder where the resin and/or mixture was heat plastified and extruded through a three layer coextrusion spiral die into a primary tube. The extruder barrel temperatures for the core layer were about 375° F. (191° C.) and for the first and second outer layers were about 400° F. (204° C). The extrusion die had an annular exit opening of 1¼ inch diameter with a 0.060 inch gap (3.175 cm×0.152 cm). The coextrusion die temperature profile was set from about 400° F. to 420° F. (204° C.–216° C.). The extruded multilayer primary tube was cooled by spraying with unheated tap water (about 12°–24° C.).

The cooled primary tube was flattened by passage through a pair of nip rollers whose speed was controlled to neck down the primary tube to adjust the tube circumference or flat width. In Examples I–III, a flattened tube of 1 inch (2.54 cm) flat width and 20 mil (0.0508 cm) thickness was produced.

In examples II and III the cooled primary tubes were briefly (<1 minute) passed through an open tank of water prior to reheating for orientation.

The cooled, flattened primary tube was reheated, biaxially stretched, and cooled. The cooled, flattened, biaxially stretched and biaxially oriented film was then wound on a reel. The machine direction (M.D.) draw or orientation ratio was about 3.15:1 and the transverse direction (T.D.) bubble or orientation ratio was between about 3.75:1 to 4:1 for all the films. The draw point or orientation temperature was below the melting point for each layer oriented and above that layer's glass transition point. Draw point temperature, bubble heating and cooling rates and orientation ratios are generally adjusted to maximize bubble stability and throughput for the desired amount of stretching or orientation. The resultant films of Examples I–III oriented easily and had an excellent appearance. The tubular biaxially stretched film of Example III was annealed in line for about 3 seconds at an elevated temperature using an infrared radiant heater prior to winding on a reel. Physical properties of the films of Examples I–III were measured and are reported in Table A.

For all of the Examples I–III, the core layer comprised a 70:30 percent by weight blend of a very low density polyethylene (VLDPE) with an ethylene-methacrylic acid copolymer (EMAA). A premix was formed by blending by hand 70% VLDPE with 30% EAA. This premixed blend was then added to an extruder hopper for extrusion as the core layer. The VLDPE was a commercially available $C_2$-$C_4$-$C_6$ VLDPE terpolymer sold by Union Carbide Corporation under the trademark DEFD 1192 and had a reported density of 0.912 g/cm$^3$ and reported melt index of 0.18 dg/min. The EMAA was a commercially available copolymer sold by The DuPont Company under the trademark NUCREL® 1202 HC and had a reported typical methacrylic acid content of 12.0 percent by weight and a reported melt index of 1.5 dg/min. The first and second outer layers of all of the Examples I–III comprised a nylon 6/66 copolymer. The nylon 6/66 was a copolymer reportedly of about 85% nylon 6 and about 15% nylon 66 with a relative viscosity of about $4.2\eta_r$ in 98% sulfuric acid and was commercially available from under the trademark Amilan 6041 from Toray Industries, Inc. of Tokyo, Japan or from Montor Performance Plastics Company of Auburn Hills, Mich. under the trademark Montor CM 6041XF.

TABLE A

| EX. NO. | Avg. GAUGE mil (micron) | O$_2$GTR† | WVTR†† | ELONG. AT BREAK % at RT MD/TD | TENSILE STRENGTH ×10$^3$ psi at RT MD/TD | SECANT MODULUS at 1% ×10$^3$ psi (MPa) MD/TD | SHRINK at 90° C. % MD/TD | SHRINK FORCE at 90° C. gm/mil (Kg/cm) MD/TD | at RT gm/mil (Kg/cm) MD/TD |
|---|---|---|---|---|---|---|---|---|---|
| I | 1.83 (46.5) | 39 (49.5) | 42 (48.3) | 140/84 | 21/25 (143/171) | 72/47 (493/327) | 32/34 | 195/262 (76.8/103) | 137/140 (53.9/55.1) |
| II | 1.90 (48.3) | 34 (55.9) | 34 (55.9 | 140/79 | 24/26 (164/179) | 74/47 (508/327) | 33/34 | 204/255 (80.3/100) | 136/136 (53.5/53.5) |
| III | 1.93 (49.0 | 37 (54.6) | 33 (54.6) | 143/70 | 24/23 (163/159) | 76/42 (522/291) | 31/30 | 209/232 (82.3/91.3) | 149/117 (58.7/46.1) |

RT = ROOM TEMPERATURE
†Oxygen gas transmission rate (O$_2$GTR) in units of cm$^3$ per m$^2$ per 24 hours at 1 atmosphere and 23° C. for the thickness of the film tested. Film thickness is listed below the rate in microns ( ).
††Water Vapor transmission rate (WVTR) in units of grams per m$^2$ per 24 hours for the thickness of the film tested. Film thickness is listed below the rate in microns ( ).

The properties measured and reported in Table A demonstrate that a multilayer casing suitable for use as a food casing may be made according to the present invention. The inventive casings are strong yet supple and soft as indicated by their tensile strength, elongation at break and 1% secant modulus values. Good oxygen impermeability values were also measured. The shrinkage values and shrink force values indicate properties which according to the present invention will provide a nonwrinkling appearance for encased sausage. The shrink forces are sufficient to keep the casing smooth and tight against the encased foodstuff without being so strong as to cause undesirable distortion of the sausage during cooking.

The casings of Examples I–III were stuffed with fleischwurst. The stuffed casings were cooked and the sausages were chilled. All samples exhibited excellent appearance and meat adhesion.

EXAMPLES 1–5

In Examples 1–2, two biaxially stretched, heat shrinkable, multilayer films of the present invention were made. The layers of each multilayer film were coextruded and biaxially stretched according to a coextrusion type of tubular orientation process.

Examples 1–2 are three layered films. However, films of four or more layers are contemplated by the present invention. The inventive multilayer films may include layers to add or modify various properties of the desired film such as heat sealability, meat adhesion, shrinkability, wrinkle resistance, puncture resistance, printability, toughness, gas or water barrier properties, abrasion resistance and optical properties such as gloss, haze, freedom from lines, streaks or gels. These layers may be formed by any suitable method including coextrusion, extrusion coating and lamination.

For Examples 1–2, one extruder was used for each layer and the heat plastified resins from each extruder were introduced to a coextrusion die from which the resins were coextruded at a first outer: core: second outer layer ratio of about 56:19:12 for Example 1 and 57:29:19 for Example 2.

In both examples, for each layer, the resin or resin mixture was fed from a hopper into an attached standard single screw extruder where the resin and/or mixture was heat plastified and extruded through a three layer coextrusion spiral die into a primary tube. The extruder barrel temperatures for the core layer were about 375° F. (191° C.) and for the first and second outer layers were about 400° F. (204° C). The extrusion die had an annular exit opening of 1¼ inch diameter with a 0.060 inch gap (3.175 cm×0.152 cm). The coextrusion die temperature profile was set from about 400° F. to 420° F. (204° C.–216° C.). The extruded multilayer primary tube was cooled by spraying with unheated tap water (about 12°–24° C.).

The cooled primary tube was flattened by passage through a pair of nip rollers whose speed was controlled to neck down the primary tube to adjust the tube circumference or flat width. In Example 1, a flattened tube of 1 inch (2.54 cm) flat width and 21 mil (0.0533 cm) thickness was produced; whereas Example 2 had respective dimensions of $^{15}/_{16}$ inch (2.38cm) by 20 mil (0.0508 cm). The cooled flattened primary tube was reheated, biaxially stretched, and cooled.

The cooled film was flattened and the biaxially stretched and biaxially oriented film was wound on a reel. The machine direction (M.D.) draw or orientation ratio was about 3.15:1 and the transverse direction (T.D.) bubble or orientation ratio was about 3.9:1 for all the films. The draw point or orientation temperature was below the melting point for each layer oriented and above that layer's glass transition point. Draw point temperature, bubble heating and cooling rates and orientation ratios are generally adjusted to maximize bubble stability and throughput for the desired amount of stretching or orientation. The resultant films of Examples 1–2 oriented easily and had an excellent appearance. Both films curled easily. Physical properties of the films of Examples 1 and 2 were measured and are reported in Table 1.

Samples of the films of Examples 1 and 2 were each annealed by winding the flattened tubular film on a 6 inch (15.24 cm) diameter cardboard reel with the outer end of each reeled tube secured by adhesive tape and placing the secured reeled film in a circulating hot air oven at 70° C. for ten minutes to dimensionally stabilize the film. The physical properties of the annealed films were measured and are reported in Table 1 as Examples 3 and 4. Examples 1 and 3 are identical films except that the film of Example 3 has been annealed. Similarly, the film of Examples 2 and 4 are identical, except Example 4 is annealed.

Annealing reduced the flatwidth of Example 1 from 3⅞ inch (9.84 cm) to the 3¼ inch (8.26 cm) flatwidth of Example 3. The flatwidth of Example 2 was similarly reduced from 3½ inches (8.89 cm) to the 3 inches (7.62 cm) of Example 4. The annealed films were dimensionally stable and maintained their desirable physical properties for use as a food casing e.g. for fleischwurst or liver sausage.

Example 5 is film identical to that of Example 1 except it has been aged for four months under ambient warehouse conditions as a flattened reeled tube. Physical properties of the aged film were measured and are reported in Table 1 as Example 5. This example demonstrates that important properties of the film are very stable over time, in particular shrinkage values. Also, low temperature shrinkage values of at least 10% in both directions indicate that the film may be utilized in applications where low shrinkage temperatures are desired.

For all of the Examples 1–5, the core layer comprised a 70:30 percent by weight blend of an ethylene-vinyl acetate copolymer (EVA) with an ethylene-methacrylic acid copolymer (EMAA). A premix was formed by blending by hand 70% EVA with 30% EAA. This premixed blend was then added to an extruder hopper for extrusion as the core layer. The EVA was a commercially available copolymer sold by Union Carbide Corporation under the trademark DQDA 6833 and had a reported vinyl acetate content of 10 percent by weight and reported melt index of 0.25 dg/min. The EMAA was a commercially available copolymer sold by The DuPont Company under the trademark NUCREL® 1202 HC and had a reported typical methacrylic acid content of 12.0 percent by weight and a reported melt index of 1.5 dg/min. The first and second outer layers of all of the Examples 1–5 comprised a nylon 6/66 copolymer. The nylon 6/66 was a copolymer reportedly of about 85% nylon 6 and about 15% nylon 66 with a relative viscosity of about $4.2\eta_r$ in 98% sulfuric acid and was commercially available from under the trademark Amilan 6041 from Toray Industries, Inc. of Tokyo, Japan or from Montor Performance Plastics Company of Auburn Hills, Mich. under the trademark Montor CM 6041XF.

TABLE 1

| Ex. No. | Avg GAUGE mil (micron) | $O_2$GTR† | ELONGATION AT BREAK % at RT MD/TD | TENSILE STRENGTH ×10³ psi at RT MD/TD | SECANT MODULUS at 1% ×10³ psi (MPa) MD/TD | SHRINK at 90° C. % MD/TD | SHRINK at 60° C. % MD/TD | SHRINK FORCE at 90° C. gm/mil (Kg/cm) MD/TD | SHRINK FORCE at RT gm/mil (Kg/cm) MD/TD |
|---|---|---|---|---|---|---|---|---|---|
| 1 | 2.69 (68.3) | 29 (52.3) | 139/88 | 21/19 (140/130) | 24/28 (170/190) | 33/34 | ND | 174/177 (68.5/69.7) | 136/85 (53.5/33.5) |
| 2 | 2.33 (59.1) | 35 (50.8) | 142/82 | 21/20 (140/140) | 75/18 (520/120) | 33/33 | ND | 160/179 (63.0/70.5) | 122/103 (48.0/40.6) |
| 3 | 2.57 (65.3) | 25 (59.7) | 123/81 | 23/19 (160/130) | 58/37 (400/260) | 33/32 | ND | 204/191 (803/75.2) | 153/86 (60.2/33.9) |
| 4 | 2.41 (61.2) | 33 (54.6) | 121/106 | 23/25 (160/170) | 65/38 (450/260) | 33/31 | ND | 202/161 (79.5/63.4) | 145/92 (57.1/36.2) |
| 5 | 2.74 (69.6) | ND | ND | ND | 96/80 (660/550) | 27/29 | 12/14 | ND | ND |

ND = NOT DETERMINED
RT = ROOM TEMPERATURE
†Oxygen gas transmission rate ($O_2$GTR) in units of cm³ per m² per 24 hours at 1 atm. and 23° C. for the thickness of film tested. Film thickness is listed below the rate in microns ( ).

The properties measured and reported in Table 1 demonstrate that a multilayer casing suitable for use as a food casing may be made according to the present invention. The inventive casings are strong yet supple and soft as indicated by their tensile strength, elongation at break and 1% secant modulus values. Good oxygen impermeability values were also measured. The shrinkage values and shrink force values indicate properties which according to the present invention will provide a nonwrinkling appearance for encased sausage. The shrink forces are sufficient to keep the casing smooth and tight against the encased foodstuff without being so strong as to cause undesirable distortion of the sausage during cooking. The invention can also provide good low temperature (60° C.) shrink for applications where this is desired as shown in Example 5.

The casings of Examples 1–4 were soaked in water at about 80° F. (27° C.) for about one half hour and then hand stuffed with fleischwurst. The stuffed casings were cooked at about 165° F. (74° C.) until the internal temperatures of the sausages reached 150° F. (66° C.) and the sausages were chilled. All samples exhibited excellent appearance and meat adhesion. All samples were curved.

The casing of Example 5 was also soaked in water at about 80° F. (27° C.) for about one half hour, then stuffed with fleischwurst and steam cooked at about 165° F. (74° C.) until the internal temperature of the sausages reached 152° F. 67° C.) and then chilled to about 40° F. (4° C.). The sample had excellent meat adhesion, and an unwrinkled appearance. The clipped casing tail showed delamination and casing curvature was noted. The cooking yield was 99.84 weight % (average for 2 samples) relative to the uncooked weight of the stuffed sausage.

EXAMPLES 6–17

The multilayer films of examples 6–12 were all made generally according to the procedures described above for examples 1 and 2 except as noted below. Examples 6–10 are of the present invention. Examples 11 and 12 are comparative examples which are not of the present invention. For Examples 6–11, the layer ratios and T.D. orientation ratios are believed to be similar to those reported for examples 1–2. The M.D. orientation ratio was about 3.2:1 for examples 6–7, about 3.15:1 for examples 8–11, and about 2.83:1 for example 12. The T.D. orientation ratio for example 12 was about 4:1 and the layer ratio was 3:2 (polyamide layer to olefin layer). For examples 6–11 the cooled primary tube was briefly (<1 minute) passed through an open tank of warm water prior to reheating for orientation and the cooled, flattened tube had an approximately 1 inch (2.54 cm) flat width and 20 mil (508 micron) tube wall thickness. Comparative example 12 omitted passage through the water tank and its primary tube had an approximately 0.875 inch (2.22 cm) flat width and 25 mil (635 micron) tube wall thickness.

For all of the examples of the invention and comparative example 11, the first and second outer layers comprised nylon 6/66 copolymer (85/15) having a reported 4.2η$_r$ in 98% sulfuric acid which is commercially available under the trademark Amilan 6041 from Toray Industries, Inc. of Japan or from Montor Performance Plastics Company of Michigan under the trademark Montor CM 6041XF. For examples 8–11 the core layer composition was an EVA:EMAA (70/30 wt. %) blend as described above for examples 1–5. For example 6, the core layer composition was the same as that for examples 8–11 except that 60 wt. % of the EVA was blended with 40 wt. % of the EMAA. For example 7, the core layer blend was the same as for examples 8–11 except that 10 wt. % of a maleic anhydride modified low density polyethylene (hereinafter "LDPE-MA") was added to the 70:30 blend of EVA:EMAA. Thus, the core layer of example 7 was a blend of 63% EVA, 27% EMAA, and 10% LDPE-MA. The LDPE-MA utilized had a reported density of 0.920 g/cm³, a melt index of 2.5 dg/min and vicat softening point of 94° C., and was commercially available under the trademark PLEXAR PX169 from Quantum Chemical Corporation of Cincinnati, Ohio, U.S.A.

The tubular biaxially stretched film of examples 6 and 7 were not annealed but were rewound on reels under low tension. The freshly made film of example 6 had an excellent visual appearance and the appearance of the film of example 7 was very good. Physical properties of the films of examples 6–7 were measured and are reported in Table 2.

The tubular biaxially stretched films of examples 8–10 were annealed in line for about 3 seconds at increasing temperatures using an infrared radiant heater. Comparative example 11 was a sample of the annealed multilayer film of example 8 which was further annealed by soaking in water for about 5 minutes followed by heating in a 90° C.

circulating hot air oven to produce a film having a shrinkage value at 90° C. not below 10% in both the M.D. and T.D. directions. Physical properties of the films of examples 8–11 were measured and are reported in Table 2.

In comparative example 12 a two layer film was extruded in a similar manner as for the three layer examples of the invention except the first polyamide outer layer comprised nylon 6/66 copolymer used in examples 1 and 2, the core layer comprised 80 wt. % of EVA and 20 wt. % of high density polyethylene (HDPE), and the second polyamide outer layer was omitted. Thus, in this example the core layer became a second surface layer. The EVA was commercially available under the trademark NORCHEM 480 and had a reported vinyl acetate content of 4.5 weight percent and melt index of 0.25 dg/min. The HDPE was commercially available from Union Carbide Corporation under the trademark 6093. The barrel temperature of the olefinic layer was set at about 350° F. (177° C.). In this comparative example the extruder primary tube was cooled with a water ring, wound on a reel, and subsequently unreeled and biaxially stretched. The primary tube had an excellent appearance. This film was biaxially stretched without passing the primary tube though a water tank as was done in examples 6–11. During biaxial stretching, the EVA:HDPE blend layer delaminated from the polyamide layer. This delamination was undesirable and demonstrated poor adhesion of the HDPE containing layer to the polyamide. The layers were separated and physical properties of the polyamide layers were measured and are reported in Table 2 below.

The films of examples 13–17 were all commercially available polyamide containing films not of the present invention. In these comparative examples the films were analyzed by infra-red spectroscopy and differential scanning calorimetry. The film of comparative example 13 is believed to be a monolayer blown film of nylon. The film of comparative example 14 is believed to be a biaxially stretched monolayer film of nylon. The film of comparative example 15 is believed to be a biaxially stretched monolayer film of nylon. The film of comparative example 16 is believed to be a biaxially stretched monolayer film comprising a blend of a polyester with nylon. The film of comparative example 17 is believed to be a biaxially stretched, multilayer, tubular film having an exterior surface layer of a nylon 6 type polymer believed to be nylon 6/66 copolymer attached via an ethylenic polymer adhesive to an interior surface layer of a linear copolymer of ethylene and an alpha-olefin. The film is believed to have had corona treatment on its interior olefinic surface to improve meat adhesion. Physical properties of the films of comparative examples 13–17 were measured and are reported in Table 2 below.

TABLE 2

| EXAM NO. | FLAT WIDTH mm | AVG. GAUGE mil (micron) | ELONGATION AT BREAK % at RT M.D./T.D. | TENSILE STRENGTH ×10³ psi (MPa) at RT M.D./T.D. | SECANT MODULUS at 1% ×10³ psi (MPa) M.D./T.D. | O₂GTR† | WVTR†† |
|---|---|---|---|---|---|---|---|
| 6 | 98 | 1.82 (46.2) | 112/54 | 24/26 (168/179) | 119/73 (823/502) | 27.6 (40.6) | ND |
| 7 | 94 | 1.73 (43.9) | 121/62 | 26/34 (178/236) | 203/104 (1400/720) | 29.5 (39.4) | ND |
| 8 | 92 | 1.90 (48.3) | 121/81 | 22/30 (149/204) | 131/122 (903/838) | 31.8 (45.7) | 49.6 (44.5) |
| 9 | 89–90 | 2.01 (51.1) | 144/97 | 23/31 (155/217) | 177/103 (1220/709) | 30.2 (50.8) | 45.0 (53.3) |
| 10 | 83–86 | 2.23 (56.6) | 126/109 | 21/30 (142/204) | 177/90 (1220/619) | 25.7 (53.3) | 41.9 (54.6) |
| 11 | 81 | ND | ND | ND | ND | ND | ND |
| 12 | 89 | 1.31 (33.3) | 151/50 | 27/38 (183/264) | 186/178 (1284/1230) | 34.1 (34.3) | ND |
| 13 | 149 | 1.86 (47.2) | 314/316 | 10/10 (69/69) | 124/135 (857/930) | 3.1 (49.5) | 150 (45.7) |
| 14 | 146 | 2.85 (72.4) | 154/150 | 21/30 (144/208) | 242/272 (1665/1873) | 10.9 (68.6) | 158 (68.6) |
| 15 | 92 | 1.96 (49.8) | 89/73 | 22/27 (151/184) | 96/94 (662/646) | 18.9 (45.7) | 81 (45.7) |
| 16 | 95 | 1.56 (39.6) | 90/115 | 32/34 (224/235) | 310/215 (2140/1485) | 13 (38.1) | 144 (40.6) |
| 17 | 92 | 2.17 (55.1) | 72/26 | 12/8 (85/58) | 58/52 (402/361) | 70.8 (48.3) | 19 (48.3) |

| EXAMPLE NO. | SHRINK at 90° C. % M.D./T.D. | SHRINK at 60° C. % M.D./T.D. | SHRINK FORCE at 90° C. gm/mil (Kg/cm) M.D./T.D. | SHRINK FORCE at RT gm/mil (Kg/cm) M.D./T.D. |
|---|---|---|---|---|
| 6 | 28/31 | 12/16 | 223/343 (87.8/135) | 194/264 (76.4/104) |
| 7 | 28/32 | 14/17 | 243/473 (95.7/186) | 212/389 (83.5/153) |
| 8 | 23/28 | 9/11 | 125/209 (49.2/82.3) | 124/162 (48.8/63.8) |
| 9 | 24/27 | 10/10 | 155/161 (61.0/63.4) | 124/162 (48.8/63.8) |
| 10 | 24/20 | 8/7 | 124/99 | 108/61 |

TABLE 2-continued

| | | | | |
|---|---|---|---|---|
| | | | (48.8/39.0) | (42.5/24.0) |
| 11 | 5/6 | ND | 10/14 | 14/8 |
| | | | (3.9/5.5) | (5.5/3) |
| 12 | 28/30 | ND | 294/286 | 356/189 |
| | | | (116/113) | (140/74.4) |
| 13 | 0/0 | ND | ND | ND |
| 14 | 0/0 | ND | ND | ND |
| 15 | 8/8 | ND | 50/93 | 36/38 |
| | | | (20/37) | (14/15) |
| 16 | 8/5 | ND | ND | ND |
| 17 | 11/11 | ND | 15/41 | 26/25 |
| | | | (5.9/16) | (10/9.8) |

†Oxygen gas transmission rate (O$_2$GTR) in units of cm$^3$ per 24 hours at 1 atmosphere and 23° C. for the thickness of the film tested. Film thickness is listed below the rate in microns ( ).
††Water Vapor transmission rate (WVTR) in units of grams per m$^2$ per 24 hours for the thickness of the film tested. Film thickness is listed below the rate in microns ( ).
ND = Not Determined
RT = Room Temperature The properties measured and reported in Table 2 demonstrate many of the benefits and advantages of the present invention. All of the inventive film samples 6–10 exhibited excellent combinations of film properties which indicate formation of strong yet supple and soft films which are suitable for use in food casings. In all of these films the first and second outer layers of polyamide adhered well to opposing sides of the core layer without delamination. In Examples 6–8 the composition of the core layer was varied. The Elemendorf tear strengths were also measured in the machine direction and transverse direction and the films of Examples 6–8 had respective M.D./T.D. values of 11/13, 9/14 and 11/16 g/mil (430/510, 350/550 and 430/630 g/micron).

Referring now to Examples 8–10 of the present invention, a series of films were identically made except for being annealed at different temperatures to stabilize film properties. Referring to Table 2, it is seen that annealing may be used to reduce and adjust the flat width of the casing without having a deleterious effect on casing properties. Comparison of the properties of the inventive casings (Examples 6–10) to commercially available polyamide casings (Examples 13–17) demonstrate the advantages of the inventive casings.

Comparative Example 13 was pre-clipped casing sold under the trademark TRIPAN by Naturin-Werk Becker & Company (hereinafter Naturin). The melting point of this monolayer casing was measured by DSC to be about 261° C. As see by the data in Table 2, the inventive casing is a much better moisture vapor barrier, and has better mechanical strength. The film of comparative Example 13 has a similar oxygen transmission rate, however the rate of oxygen transmission is known to increase for aliphatic polyamides such as nylon 66 and nylon 6 with increasing moisture levels in the polyamide. As noted above this commercial casing transmits moisture at a rate about 2–3 times the WVTR of the inventive casings and does not measurably shrink at 90° C.

Comparative Example 14 was a clear shirred casing sold under the trademark OPTAN by Naturin. This comparative casing had a melting point of about 219° C. as determined by DSC. This casing also had low oxygen and high moisture transmission properties relative to the inventive casings and did not measurably shrink at 90° C.

Comparative Example 15 was a printed, shirred casing having a major melting point of about 220° C. and sold under the trademark BETAN by Naturin. This casing has an increased oxygen transmission rate and decreased moisture transmission rate relative to comparative Example 16. Also, this casing has less than 10% shrink at 90° C. in both M.D. and T.D. directions and low shrink force values.

Comparative Example 16 was a printed, flat stock casing sold under the trademark NALOPHAN EP-EFK by Hoechst AG and is believed to be a monolayer, oriented film. This casing exhibited lower oxygen and higher moisture transmission relative to the inventive casings and less than 10% shrink at 90° C. in both M.D. and T.D. directions.

Comparative Example 17 was a colored, shirred, tubular casing sold under the trademark SUPRALON and is believed to be a multilayer oriented film made by Gunze Ltd. and having an interior surface layer comprising a polyolefin having a melting point of about 122° C. attached to an exterior nylon surface layer having a melting point of about 199° C. via an adhesive having a melting point of about 106° C. The polyamide layer was the exterior layer of the tube and the polyolefin layer was the interior surface layer. The interior layer is believed to have been corona treated to improve meat adhesion. This film has very good moisture resistance but a relatively high oxygen transmission rate and shrinkage values of about 11% at 90° C. and low shrink force values.

Disadvantageously, Betan and Optan casings such as comparative Examples 15 and 14 after stuffing, cooking, and chilling, typically have a wrinkled appearance which is improved through "after shrinking" by passage through a 195° F. (90.5° C.) hot water shrink tunnel.

The tubular casings of Examples 9 and 10 were hand stuffed with fleischwurst, cooked, chilled and compared to control casings similar to comparative Example 17 which were similarly stuffed and processed. All casings were slightly curved with the control casing exhibiting the greatest amount of curvature. Both the inventive casings of Examples 9–10 and the control sample were successfully sliced on automated slicing equipment without developing casing shards. Also, both the inventive casings and control casings exhibited excellent adhesion of the interior casing film surface to the cooked meat emulsion except that the control casing did not adhere to the meat product along its casing edges. Advantageously, the present invention does not suffer from this defect and does not require the additional step of corona treatment for meat adhesion as described in U.S. Pat. No. 4,888,223.

Samples of the inventive casing of Example 8 were conventionally shirred and restrained in netting without use of a sizing tube. The shirred casing was subsequently placed on a core and stuffed using a SHIRMATIC® 600A SIZER stuffing machine equipped with a SHIRMATIC 403 adapter kit. The inventive shirred casing was stuffed with and without presoaking in water at 80° F. (27° C.) for about 30 minutes. The unsoaked casing had comparable performance to the soaked casing with good cooking yield, excellent meat adhesion and good uniformity of diameter and length in stuffing and cooking.

In comparative Example 11, a sample of the inventive casing of Example 8 was annealed to reduce shrinkage values at 90° C. below about 10% in both M.D. and T.D. directions to compare properties of a low shrink, biaxially stretched casing to the inventive casing. The casing of this comparative example exhibited both low shrinkage values and low shrink forces. The casings of Examples 8 and 11 were stuffed with fleischwurst, steam cooked at 165° F.(74° C.) until the sausages reached an internal temperature of about 152° F.(67° C.) and chilled. The cooked and chilled sausage of comparative Example 11 had a non-uniform knobby appearance and was slightly more wrinkled than sausage encased with the inventive casing of Example 8. Advantageously, casings of the present invention have sufficient shrinkage and shrink force values to produce wrinkle resistant casings for manufacture of sausages having surfaces with a smooth uniform appearance. Nylon casings having low or no shrinkage values at 90° C. rely upon elastomeric properties to promote a wrinkle-free appearance (see e.g. DE 32 27 945) and may require "after shrinking" to fully remove wrinkles from cooked and chilled products. Beneficially, casings of the present invention utilize shrink and shrink force properties to avoid wrinkles and do not require "after shrinking". Also, there is no need to blend polyester or other materials into the polyamide layers when using nylon 6/66 copolymer according to the present invention in order to biaxially stretch orient the film. Biaxial stretching may easily be performed without use of special blends or polymeric plasticizers.

Comparative Example 12 was a monolayer, biaxially stretched polyamide film of nylon 6/66 copolymer as described above. Disadvantageously such film is not protected against absorption of moisture which is believed to detrimentally increase oxygen transmission across the film at higher moisture levels.

Advantageously, films and casings of the present invention may be easily shirred using conventional lubricants for use on automatic stuffing machines. Also, the inventive films may be printed. Inks adher well to the polyamide layer.

Further modifications of the invention disclosed will be apparent to those skilled in the art and all such modifications are deemed to be within the scope of the invention as defined by the following claims.

What is claimed is:

1. A tubular, biaxially stretched, heat shrinkable, multilayer film, food casing consisting essentially of three polymeric layers:

(a) an inner layer comprising a polyamide;

(b) a core layer comprising at least 60% by weight of at least one polyolefin selected from the group of copolymers of ethylene with at least one $C_3$–$C_{10}$ α-olefin, VLDPE, LLDPE, copolymers of ethylene with an alkyl acrylate, LDPE, HDPE, and blends thereof; and (c) an outer layer comprising a polyamide; wherein said core layer (b) is disposed between and directly adhered to said inner layer (a) and said outer layer (c), and said multilayer film has a shrinkage value of at least 20% in at least one direction at 90° C.

2. A casing, as defined in claim 1, wherein said film has a shrinkage value of at least 20% at 90° C. in both the longitudinal and transverse directions.

3. A casing, as defined in claim 1, wherein said polyolefin comprises VLDPE.

4. A casing, as defined in claim 2, wherein said polyolefin comprises a VLDPE copolymer of ethylene and octene-1.

5. A casing, as defined in claim 1, wherein said polyolefin comprises a terpolymer of ethylene, butene-1, and hexene-1, said terpolymer having a density less than 0.915 g/cm³.

6. A casing, as defined in claim 1, wherein said casing is a seamless tubular film.

7. A casing, as defined in claim 1, wherein said casing is shirred.

8. A casing, as defined in claim 1, wherein said inner layer (a) is meat adhering.

9. A casing, as defined in claim 1, wherein said casing has an $O_2$ transmission rate of less than 75 cm³ per m² per 24 hours at 1 atmosphere and at a temperature of 23° C.

10. A casing, as defined in claim 1, wherein said layers (a), (b) and (c) are coextruded.

11. A casing, as defined in claim 1, wherein at least one of said layers is coating laminated.

12. A casing, as defined in claim 1, wherein said multilayer film has a moisture vapor transmission of less than 75 g per m² per 24 hours at 1 atmosphere and at a temperature of 37.8° C.

13. A casing, as defined in claim 1, wherein said film has a tensile strength in at least one of the machine and transverse directions of at least 15,000 psi (103 MPa) at 23° C.

14. A casing, as defined in claim 1, wherein said multilayer film has a thickness of between about 1 to 3 mils (25.4–76.2 microns).

15. A casing, as defined in claim 1, wherein said film has a shrink force of at least about 30 Kg/cm at 90° C. in both the machine and transverse directions.

16. A casing, as defined in claim 1, wherein said inner layer (a) comprises at least 60% by weight of a polyamide or blend of polyamides.

17. A casing, as defined in claim 1, wherein said inner layer (a) comprises at least 90% by weight of a polyamide or blend of polyamides.

18. A casing, as defined in claim 1, wherein said inner layer (a) comprises nylon 6.

19. A casing, as defined in claim 1, wherein said inner layer (a) comprises nylon 6/66.

20. A casing, as defined in claim 1, wherein said outer layer (c) comprises nylon 6.

21. A casing, as defined in claim 1, wherein said outer layer (c) comprises nylon 6/66.

22. A casing, as defined in claim 1, wherein each of said layers (a) and (c) comprise nylon 6/66.

23. A casing, as defined in claim 1, wherein said core layer comprises at least 50% by weight of a copolymer of ethylene with at least one $C_4$–$C_8$ alpha-olefin, having a copolymer density of less than 0.915 g/cm³, blended with at least 10% by weight of ethylene methacrylic acid copolymer.

24. A casing, as defined in claim 1, wherein said core layer (b) consists essentially of a blend of VLDPE and a copolymer of ethylene and methacrylic acid.

25. A casing, as defined in claim 3, wherein said VLDPE has a $C_4$–$C_8$ alpha olefin content of at least about 8% by weight based upon said VLDPE.

26. A casing, as defined in claim 1, wherein said polyolefin has a melt index between about 0.1 and 0.7 dg/min as measured by ASTM D-1238, condition E.

27. An encased foodstuff comprising a heat processed fat containing and protein containing foodstuff encased in a film casing as defined in claim 1, wherein said foodstuff is in direct contact with said inner layer (a) and adheres thereto.

28. A tubular, biaxially stretched, heat shrinkable multilayer film food casing comprising:

(a) an inner layer comprising a polyamide;

(b) a core layer comprising at least 60% by weight of a very low density polyethylene (VLDPE) copolymer of ethylene and at least one $C_4$–$C_8$ alpha-olefin, said copolymer having a density less than 0.915 g/cm$^3$ and a melt index less than 2 dg/min.; and (c) an outer layer comprising a polyamide;

wherein said core layer (b) is disposed between inner layer (a) and outer layer (c), and said film has a shrinkage value of at least 10% in at least one direction at 90° C.

29. A casing, as defined in claim 28, wherein said VLDPE comprises a terpolymer of ethylene, butene-1 and hexene-1.

30. A casing as defined in claim 28, wherein said VLDPE comprises a copolymer of ethylene and octene.

31. A casing, as defined in claim 28, wherein said core layer further comprises at least 10% of a copolymer of ethylene and methacrylic acid.

32. A continuous process for making a tubular, biaxially stretched, heat shrinkable multilayer thermoplastic food casing comprising:

(a) coextruding a melt plastified multilayer thermoplastic tube having an exterior surface and an interior surface through an annular die wherein said tube comprises an inner polyamide layer and an outer polyamide layer with a core layer between said inner and outer layers of at least one polyolefin;

(b) cooling said coextruded tube below the melting point of each layer by applying water to the exterior surface of said tube;

(c) transferring said cooled tube to an orientation zone wherein said tube is reheated to a temperature below the melting point of each tube layer followed by cooling while a fluid mass is admitted to the interior of said tube as said tube is passed between first and second means for blocking fluid flow along the interior of said tube thereby causing said tube to stretch circumferentially about the entrapped fluid mass and simultaneous with said circumferential stretching, said tube is stretched in a direction perpendicular thereto to produce a biaxially stretched tubular film; and (d) annealing said biaxially stretched film at elevated temperature to dimensionally stabilize said film thereby producing a multilayer film having a shrinkage value at 90° C. of at least 20% or higher in at least one direction.

33. A process, as defined in claim 32, wherein said shrinkage value is in both the M.D. and T.D. directions.

34. A process, as defined in claim 37, wherein said coextruded tube after cooling step (b) and prior to said stretching step (c), has its exterior surface contacted with water under conditions sufficient to cause said outer polyamide layer to absorb water to a level greater than 0.1 and less than 1.0 weight percent based upon the weight of the outer polyamide layer.

35. A process, as defined in claim 32, wherein said inner polyamide layer has less than 1% by weight absorbed water prior to biaxially stretching.

36. A process, as defined in claim 32, wherein each of said outer and inner polyamide layers have less than 1% and more than 0.1% by weight of water therein after extrusion and prior to biaxially stretching.

* * * * *